United States Patent
Amano et al.

(10) Patent No.: US 7,559,871 B2
(45) Date of Patent: Jul. 14, 2009

(54) POWER OUTPUT APPARATUS, MOTOR VEHICLE EQUIPPED WITH POWER OUTPUT APPARATUS, AND CONTROL METHOD OF POWER OUTPUT APPARATUS

(75) Inventors: Masaya Amano, Toyota (JP); Keiji Kaita, Aichi-ken (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 412 days.

(21) Appl. No.: 11/628,511

(22) PCT Filed: Jul. 19, 2005

(86) PCT No.: PCT/JP2005/013537

§ 371 (c)(1),
(2), (4) Date: Dec. 5, 2006

(87) PCT Pub. No.: WO2006/009272

PCT Pub. Date: Jan. 26, 2006

(65) Prior Publication Data

US 2007/0243970 A1    Oct. 18, 2007

(30) Foreign Application Priority Data

Jul. 20, 2004   (JP)   ............................. 2004-211912
Sep. 16, 2004   (JP)   ............................. 2004-269937

(51) Int. Cl.
*F16H 3/72*     (2006.01)
*F16H 37/06*    (2006.01)
*B60K 1/02*     (2006.01)
*H02P 1/00*     (2006.01)
*H02P 3/00*     (2006.01)
*H02P 7/00*     (2006.01)

(52) U.S. Cl. ...................... 477/3; 477/7; 475/2; 475/4; 475/5; 903/930; 903/941; 903/942

(58) Field of Classification Search ............... 477/3, 477/7; 475/2, 4, 5; 903/930, 941, 942
See application file for complete search history.

(56) References Cited

U.S. PATENT DOCUMENTS 6,005,297 A    12/1999   Sasaki et al.

(Continued)

FOREIGN PATENT DOCUMENTS

EP   0 829 387 A2   3/1998

(Continued)

Primary Examiner—Tisha D Lewis
(74) Attorney, Agent, or Firm—Kenyon & Kenyon LLP

(57) ABSTRACT

In a reverse drive with power output from an engine, the control procedure of the invention selects a drive point of the higher rotation speed corresponding to the higher accelerator opening among available drive points that ensure output of a target engine power, and controls the engine to be driven at the selected drive point and ensure output of a torque demand corresponding to the accelerator opening to a drive shaft. A required torque level output from a motor MG2 increases with an increase in engine torque under the conditions of a fixed torque demand of the drive shaft and a fixed output power level of the engine 22. Setting a drive point of the higher rotation speed and the lower torque corresponding to a higher level of the accelerator opening ensures output of the torque demand to the drive shaft. Setting a drive point of the lower rotation speed and the higher torque corresponding to a lower level of the accelerator opening improves the drive feeling of the engine.

18 Claims, 15 Drawing Sheets

U.S. PATENT DOCUMENTS

| | | |
|---|---|---|
| 6,602,157 B2 * | 8/2003 | Kashiwase ...................... 475/5 |
| 6,719,076 B1 * | 4/2004 | Tabata et al. ............... 180/65.7 |
| 2002/0063000 A1 | 5/2002 | Kojima |

FOREIGN PATENT DOCUMENTS

| | | |
|---|---|---|
| EP | 1 160 117 A | 12/2001 |
| JP | 09-046819 | 2/1997 |
| JP | 10-083187 | 3/1998 |
| JP | 2000-078704 | 3/2000 |
| JP | 2000175303 A * | 6/2000 |
| JP | 2002-021601 | 1/2002 |
| JP | 2004-056922 A | 2/2004 |

* cited by examiner (a) D range and B range (b) R Range

POWER OUTPUT APPARATUS, MOTOR VEHICLE EQUIPPED WITH POWER OUTPUT APPARATUS, AND CONTROL METHOD OF POWER OUTPUT APPARATUS

This is a 371 national phase application of PCT/JP2005/013537 filed 19 Jul. 2005, claiming priority to Japanese Patent Applications No. 2004-211912 filed 20 Jul. 2004, and No. 2004-269937 filed 16 Sep. 2004, the contents of which are incorporated herein by reference.

TECHNICAL FIELD

The preset invention relates to a power output apparatus, a motor vehicle equipped with the power output apparatus, and a control method of the power output apparatus. More specifically the invention pertains to a power output apparatus that outputs power to a drive shaft, and a motor vehicle that is equipped with such a power output apparatus and is driven via an axle linked to the drive shaft, as well as to a control method of such a power output apparatus.

BACKGROUND ART

One proposed power output apparatus has a generator, an internal combustion engine, and a drive shaft that are respectively connected to a sun gear, a carrier, and a ring gear of a planetary gear mechanism, and a motor that is linked to the drive shaft. This power output apparatus distributes the output power of the internal combustion engine into the generator and the drive shaft (see, for example, Japanese Patent Laid-Open Gazette No. 2004-56922). Even when the drive shaft is to be rotated in a reverse direction in response to a driver's operation, the torque transmitted from the internal combustion engine to the drive shaft functions to rotate the drive shaft not in the reverse direction but only in a normal direction. Under the condition of a sufficient state of charge of a battery, the prior art power output apparatus stops the internal combustion engine and drives the motor to rotate the drive shaft in the reverse direction. Under the condition of an insufficient state of charge of the battery, on the other hand, this prior art power output apparatus controls the generator to generate electric power with the output power of the internal combustion engine. The motor consumes the generated electric power and outputs the sum of a cancellation torque to cancel out the output torque of the internal combustion engine for normal rotation of the drive shaft and a required torque for reverse rotation of the drive shaft. This rotates the drive shaft in the reverse direction.

DISCLOSURE OF THE INVENTION

When the drive shaft is to be rotated in the reverse direction simultaneously with the power output from the internal combustion engine, the prior art power output apparatus may control the internal combustion engine and the generator to drive the internal combustion engine at an efficient drive point of the low rotation speed and the high torque. This control enhances the total energy efficiency of the power output apparatus, while increasing the torque for normal rotation transmitted from the internal combustion engine to the drive shaft. This undesirably raises the torque level to be cancelled by the motor and may prevent reverse rotation of the drive shaft with a sufficient torque. The prior art power output apparatus may otherwise control the internal combustion engine and the generator to drive the internal combustion engine at a drive point of the high rotation speed and the low torque. This control decreases the torque for normal direction transmitted from the internal combustion engine to the drive shaft and lowers the torque level to be cancelled by the motor, thus ensuring reverse rotation of the drive shaft with a sufficient torque. Setting the drive point of the internal combustion engine independently of the driver's operation worsens the drive feeling, since the internal combustion engine may be driven at a drive point different from the driver's expected drive point.

The power output apparatus, the motor vehicle equipped with the power output apparatus, and the control method of the power output apparatus of the invention aim to improve drive feeling in reverse rotation of a drive shaft while ensuring output of a required driving force. The power output apparatus, the motor vehicle equipped with the power output apparatus, and the control method of the power output apparatus of the invention also aim to enhance a driving performance in reverse rotation of the drive shaft.

At least part of the above and the other related objects is attained by a power output apparatus, a motor vehicle equipped with the power output apparatus, and a control method of the power output apparatus of the invention having the configurations discussed below.

The present invention is directed to a first power output apparatus that outputs power to a drive shaft. The first power output apparatus includes: an internal combustion engine; a power conversion transmission structure that is connected to an output shaft of the internal combustion engine and to the drive shaft, the power conversion transmission structure converting at least part of output power of the internal combustion engine into electric power while transmitting a residual of the output power to the drive shaft as power in a preset rotating direction through input and output of electric power and mechanical power; a motor that is capable of outputting power both in a normal rotating direction and in a reverse rotating direction to the drive shaft with the electric power converted by the power conversion transmission structure; a driving force demand setting module that sets a required driving force of the drive shaft in response to an operator's instruction; and a control module that, when the drive shaft is to be rotated in another direction different from the preset rotating direction simultaneously with output of power from the internal combustion engine, sets a target drive point of the internal combustion engine for output of a required power from the internal combustion engine corresponding to the required driving force, and drives and controls the internal combustion engine, the power conversion transmission structure, and the motor to drive the internal combustion engine at the set target drive point and to rotate the drive shaft in the another direction with the required driving force.

When the drive shaft is to be rotated in another direction different from the preset rotating direction simultaneously with output of power from the internal combustion engine, the first power output apparatus of the invention sets the target drive point of the internal combustion engine for output of the required power from the internal combustion engine corresponding to the required driving force set in response to the operator's instruction. The internal combustion engine, the power conversion transmission structure, and the motor are driven and controlled to drive the internal combustion engine at the set target drive point and to rotate the drive shaft in another direction with the required driving force. The arrangement of the first power output apparatus takes into account the required driving force given as the operator's instruction to set the target drive point of the internal combustion engine and rotates the drive shaft in another direction with the required driving force. This arrangement thus improves the drive feeling in reverse rotation of the drive shaft, while ensuring output of the required driving force.

In one preferable embodiment of the first power output apparatus of the invention, the control module sets the target drive point to an offset drive point, which has an offset of a rotation speed toward a higher rotation speed from a preset drive point that ensures power output from the internal combustion engine under a predetermined condition, while keeping an output power level of the internal combustion engine unchanged. The predetermined condition may be a high fuel consumption condition.

In another preferable embodiment of the first power output apparatus of the invention, the control module sets the target drive point to have a higher rotation speed corresponding to a higher level of the required driving force. Such setting enables the internal combustion engine to be driven at the operator's desired rotation speed.

In still another preferable embodiment of the invention, the first power output apparatus further includes a rotation speed measurement unit that measures a rotation speed of the drive shaft. The control module may execute the control when the measured rotation speed of the drive shaft is lower than a preset reference speed.

In the first power output apparatus of the invention, the power conversion transmission structure may include: a three shaft-type power input output mechanism that is linked to three shafts, that is, the output shaft of the internal combustion engine, the drive shaft, and a third rotating shaft, and automatically determines power input from and output to a residual one shaft based on powers input from and output to any two shafts among the three shafts; and a generator that inputs and outputs power from and to the third rotating shaft. The power conversion transmission structure may also include: a pair-rotor motor that has a first rotor connected to the output shaft of the internal combustion engine and a second rotor connected to the drive shaft and outputs at least part of the output power of the internal combustion engine to the drive shaft through input and output of electric power and mechanical power by electromagnetic functions of the first rotor and the second rotor.

The present invention is also directed to a first motor vehicle. The first motor vehicle includes: an internal combustion engine; a power conversion transmission structure that is connected to an output shaft of the internal combustion engine and to a drive shaft linked with an axle of the motor vehicle, the power conversion transmission structure converting at least part of output power of the internal combustion engine into electric power while transmitting a residual of the output power to the drive shaft as power in a preset rotating direction through input and output of electric power and mechanical power; a motor that is capable of outputting power both in a normal rotating direction and in a reverse rotating direction to the drive shaft with the electric power converted by the power conversion transmission structure; a driving force demand setting module that sets a required driving force of the drive shaft in response to a driver's instruction; and a control module that, when the drive shaft is to be rotated in another direction different from the preset rotating direction simultaneously with output of power from the internal combustion engine, sets a target drive point of the internal combustion engine for output of a required power from the internal combustion engine corresponding to the required driving force, and drives and controls the internal combustion engine, the power conversion transmission structure, and the motor to drive the internal combustion engine at the set target drive point and to rotate the drive shaft in the another direction with the required driving force.

When the drive shaft is to be rotated in another direction different from the preset rotating direction simultaneously with output of power from the internal combustion engine, the first motor vehicle of the invention sets the target drive point of the internal combustion engine for output of the required power from the internal combustion engine corresponding to the required driving force set in response to the operator's instruction. The internal combustion engine, the power conversion transmission structure, and the motor are driven and controlled to drive the internal combustion engine at the set target drive point and to rotate the drive shaft in another direction with the required driving force. The arrangement of the first motor vehicle takes into account the required driving force given as the operator's instruction to set the target drive point of the internal combustion engine and rotates the drive shaft in another direction with the required driving force. This arrangement thus improves the drive feeling in reverse rotation of the drive shaft, while ensuring output of the required driving force.

In the first motor vehicle of the invention, the driving force demand setting module may set the required driving force corresponding to an accelerator opening, and the control module may set the target drive point corresponding to the accelerator opening, instead of the required driving force. This arrangement enables the internal combustion engine to be driven at the drive point corresponding to the accelerator opening, thus improving the drive feeling.

The present invention is also directed to a second power output apparatus that outputs power to a drive shaft. The second power output apparatus includes: an internal combustion engine; an electric power-mechanical power input output structure that is connected to an output shaft of the internal combustion engine and to the drive shaft, and transmits at least part of output power of the internal combustion engine to the drive shaft as power in a preset rotating direction through input and output of electric power and mechanical power; a motor that is capable of outputting power both in a normal rotating direction and in a reverse rotating direction to the drive shaft; and a control module that executes engine resistance application control when the drive shaft is to be rotated in another direction different from the preset rotating direction during operation of the internal combustion engine, the engine resistance application control driving and controlling the internal combustion engine, the electric power-mechanical power input output structure, and the motor and causing the electric power-mechanical power input output structure to output a braking force due to a rotational resistance of the internal combustion engine to the drive shaft as a driving force in the another direction different from the preset rotating direction while causing the motor to output a driving force in the another direction different from the preset rotating direction to the drive shaft.

When the drive shaft is to be rotated in another direction different from the preset rotating direction during operation of the internal combustion engine, the second power output apparatus of the invention drives and controls the internal combustion engine, the electric power-mechanical power input output structure, and the motor and causes the electric power-mechanical power input output structure to output a braking force due to a rotational resistance of the internal combustion engine to the drive shaft as a driving force in another direction different from the preset rotating direction while causing the motor to output a driving force in another direction different from the preset rotating direction to the drive shaft. The drive shaft is rotated in another direction different from the preset rotating direction with the braking force due to the rotational resistance of the internal combustion engine used as the driving force, in addition to the driving force of the motor. This arrangement enhances the driving performance in rotation of the drive shaft in another direction different from the preset rotating direction.

In one preferable embodiment of the invention, the second power output apparatus further includes a driving force demand setting module that sets a required driving force of the drive shaft in response to an operator's instruction. The control module drives and controls the internal combustion engine, the electric power-mechanical power input output structure, and the motor to ensure output of a driving force corresponding to the required driving force to the drive shaft. The drive shaft can thus be rotated in another direction different from the preset rotating direction with the driving force corresponding to the required driving force. In the second power output apparatus of this embodiment, it is preferable that the control module executes the engine resistance application control when the required driving force is not less than a preset reference driving force. This arrangement desirably reduces a potential loss of the power output apparatus in rotation of the drive shaft in another direction different from the preset rotating direction.

In another preferable embodiment of the invention, the second power output apparatus further includes a rotation speed measurement unit that measures a rotation speed of the drive shaft. The control module executes the engine resistance application control when the measured rotation speed of the drive shaft is lower than a preset reference speed.

In still another preferable embodiment of the invention, the second power output apparatus further includes: an accumulator unit that transmits electric power to and from the electric power-mechanical power input output structure and the motor; and an output limit setting module that sets an output limit of the accumulator unit. The control module executes the engine resistance application control within a range of the output limit of the accumulator unit. This arrangement effectively prevents the accumulator unit from outputting an excess electric power exceeding the output limit in rotation of the drive shaft in another direction different from the preset rotating direction.

In the second power output apparatus of the invention, the electric power-mechanical power input output structure may includes: a three shaft-type power input output mechanism that is linked to three shafts, that is, the output shaft of the internal combustion engine, the drive shaft, and a third rotating shaft, and automatically determines power input from and output to a residual one shaft based on powers input from and output to any two shafts among the three shafts; and a generator that inputs and outputs power from and to the third rotating shaft. The electric power-mechanical power input output structure may further include: a pair-rotor motor that has a first rotor connected to the output shaft of the internal combustion engine and a second rotor connected to the drive shaft and outputs at least part of the output power of the internal combustion engine to the drive shaft through input and output of electric power and mechanical power by electromagnetic functions of the first rotor and the second rotor.

The present invention is also directed to a second motor vehicle. The second motor vehicle includes: an internal combustion engine; an electric power-mechanical power input output structure that is connected to an output shaft of the internal combustion engine and to a drive shaft linked with an axle of the motor vehicle, and transmits at least part of output power of the internal combustion engine to the drive shaft as power in a preset rotating direction through input and output of electric power and mechanical power; a motor that is capable of outputting power both in a normal rotating direction and in a reverse rotating direction to the drive shaft; and a control module that executes engine resistance application control when the drive shaft is to be rotated in another direction different from the preset rotating direction during operation of the internal combustion engine, the engine resistance application control driving and controlling the internal combustion engine, the electric power-mechanical power input output structure, and the motor and causing the electric power-mechanical power input output structure to output a braking force due to a rotational resistance of the internal combustion engine to the drive shaft as a driving force in the another direction different from the preset rotating direction while causing the motor to output a driving force in the another direction different from the preset rotating direction to the drive shaft.

When the drive shaft is to be rotated in another direction different from the preset rotating direction during operation of the internal combustion engine, the second motor vehicle of the invention drives and controls the internal combustion engine, the electric power-mechanical power input output structure, and the motor and causes the electric power-mechanical power input output structure to output a braking force due to a rotational resistance of the internal combustion engine to the drive shaft as a driving force in another direction different from the preset rotating direction while causing the motor to output a driving force in another direction different from the preset rotating direction to the drive shaft. The drive shaft is rotated in another direction different from the preset rotating direction with the braking force due to the rotational resistance of the internal combustion engine used as the driving force, in addition to the driving force of the motor. This arrangement enhances the driving performance in rotation of the drive shaft in another direction different from the preset rotating direction.

The present invention is also directed to a control method of a first power output apparatus. The first power output apparatus includes: an internal combustion engine; a power conversion transmission structure that is connected to an output shaft of the internal combustion engine and to a drive shaft, the power conversion transmission structure converting at least part of output power of the internal combustion engine into electric power while transmitting a residual of the output power to the drive shaft as power in a preset rotating direction through input and output of electric power and mechanical power; and a motor that is capable of outputting power both in a normal rotating direction and in a reverse rotating direction to the drive shaft with the electric power converted by the power conversion transmission structure. The control method includes the steps of: (a) setting a required driving force of the drive shaft in response to an operator's instruction; (b) when the drive shaft is to be rotated in another direction different from the preset rotating direction simultaneously with output of power from the internal combustion engine, setting a target drive point of the internal combustion engine for output of a required power from the internal combustion engine corresponding to the required driving force; and (c) driving and controlling the internal combustion engine, the power conversion transmission structure, and the motor to drive the internal combustion engine at the set target drive point and to rotate the drive shaft in the another direction with the required driving force.

When the drive shaft is to be rotated in another direction different from the preset rotating direction simultaneously with output of power from the internal combustion engine, the control method of a first power output apparatus of the invention sets the target drive point of the internal combustion engine for output of the required power from the internal combustion engine corresponding to the required driving force set in response to the operator's instruction. The internal combustion engine, the power conversion transmission structure, and the motor are driven and controlled to drive the internal combustion engine at the set target drive point and to rotate the drive shaft in another direction with the required driving force. The arrangement of the control method of a first power output apparatus takes into account the required driving force given as the operator's instruction to set the target drive point of the internal combustion engine and rotates the drive shaft in another direction with the required driving force. This arrangement thus improves the drive feeling in reverse rotation of the drive shaft, while ensuring output of the required driving force.

The present invention is also directed to a control method of a second power output apparatus. The second power output apparatus includes: an internal combustion engine; an electric power-mechanical power input output structure that is connected to an output shaft of the internal combustion engine and to a drive shaft, and transmits at least part of output power of the internal combustion engine to the drive shaft as power in a preset rotating direction through input and output of electric power and mechanical power; and a motor that is capable of outputting power both in a normal rotating direction and in a reverse rotating direction to the drive shaft. The control method includes the step of: when the drive shaft is to be rotated in another direction different from the preset rotating direction during operation of the internal combustion engine, driving and controlling the internal combustion engine, the electric power-mechanical power input output structure, and the motor and causing the electric power-mechanical power input output structure to output a braking force due to a rotational resistance of the internal combustion engine to the drive shaft as a driving force in the another direction different from the preset rotating direction while causing the motor to output a driving force in the another direction different from the preset rotating direction to the drive shaft.

When the drive shaft is to be rotated in another direction different from the preset rotating direction during operation of the internal combustion engine, the control method of a second power output apparatus of the invention drives and controls the internal combustion engine, the electric power-mechanical power input output structure, and the motor and causes the electric power-mechanical power input output structure to output a braking force due to a rotational resistance of the internal combustion engine to the drive shaft as a driving force in another direction different from the preset rotating direction while causing the motor to output a driving force in another direction different from the preset rotating direction to the drive shaft. The drive shaft is rotated in another direction different from the preset rotating direction with the braking force due to the rotational resistance of the internal combustion engine used as the driving force, in addition to the driving force of the motor. This arrangement enhances the driving performance in rotation of the drive shaft in another direction different from the preset rotating direction.

BEST MODES OF CARRYING OUT THE INVENTION

Some modes of carrying out the invention are described below as preferred embodiments.

A. First Embodiment

Figure 1:
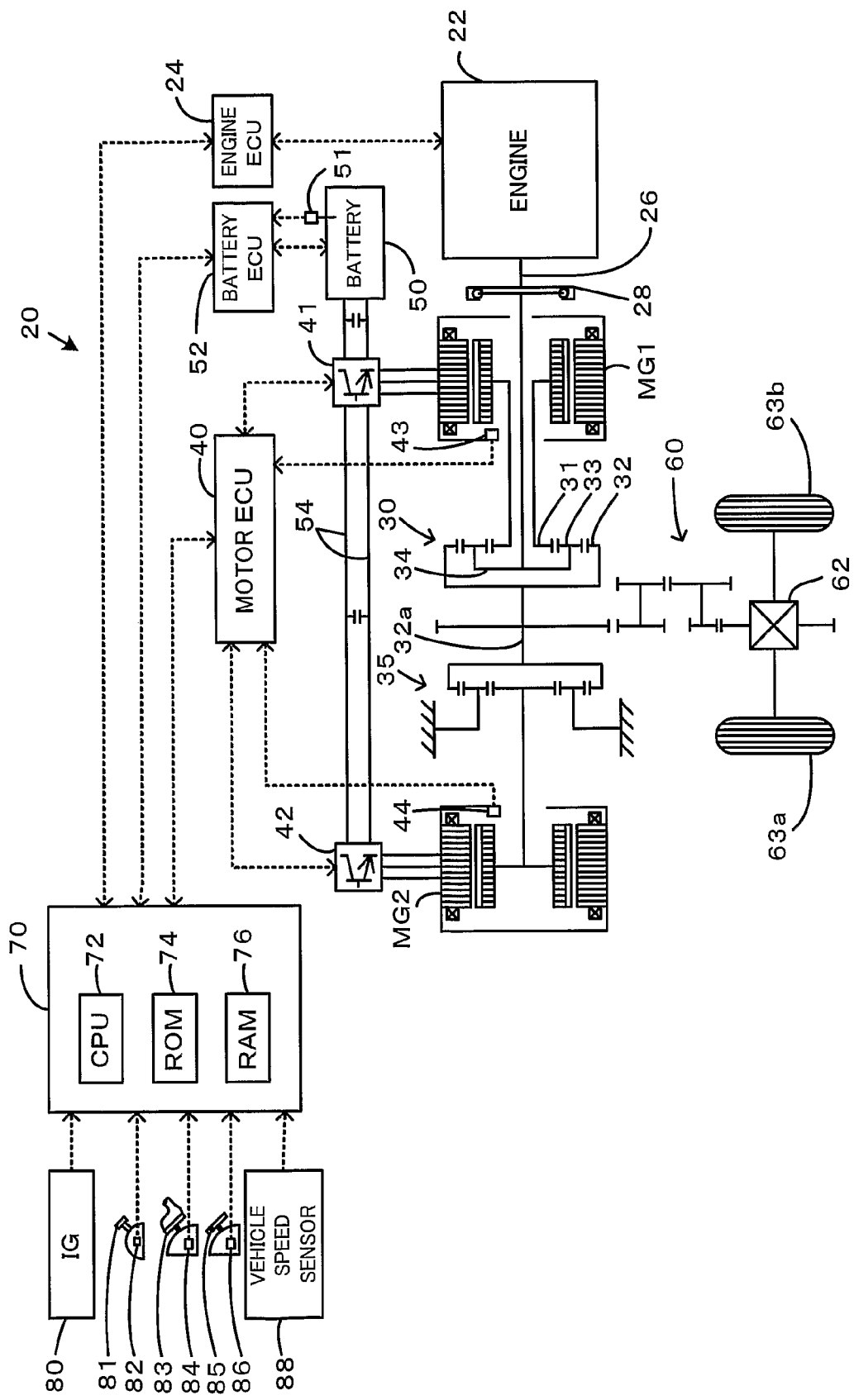
FIG. 1 schematically illustrates the configuration of a hybrid vehicle equipped with a power output apparatus in a first embodiment of the invention.

FIG. 1 schematically illustrates the construction of a hybrid vehicle 20 with a power output apparatus mounted thereon in one embodiment of the invention. As illustrated, the hybrid vehicle 20 of the first embodiment includes an engine 22, a three shaft-type power distribution integration mechanism 30 that is linked with a crankshaft 26 functioning as an output shaft of the engine 22 via a damper 28, a motor MG1 that is linked with the power distribution integration mechanism 30 and is capable of generating electric power, a reduction gear 35 that is attached to a ring gear shaft 32a functioning as a drive shaft connected with the power distribution integration mechanism 30, another motor MG2 that is linked with the reduction gear 35, and a hybrid electronic control unit 70 that controls the whole power output apparatus.

The engine 22 is an internal combustion engine that uses a hydrocarbon fuel, such as gasoline or light oil, to output power. An engine electronic control unit (hereafter referred to as engine ECU) 24 receives signals from diverse sensors that detect operating conditions of the engine 22, and takes charge of operation control of the engine 22, for example, fuel injection control, ignition control, and intake air flow regulation. The engine ECU 24 communicates with the hybrid electronic control unit 70 to control operations of the engine 22 in response to control signals transmitted from the hybrid electronic control unit 70 while outputting data relating to the operating conditions of the engine 22 to the hybrid electronic control unit 70 according to the requirements.

The power distribution and integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution and integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution and integration mechanism 30 are respectively coupled with the crankshaft 26 of the engine 22, the motor MG1, and the reduction gear 35 via ring gear shaft 32*a*. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The power output to the ring gear 32 is thus finally transmitted to the driving wheels 63*a* and 63*b* via the gear mechanism 60, and the differential gear 62 from ring gear shaft 32*a*.

Both the motors MG1 and MG2 are known synchronous motor generators that are driven as a generator and as a motor. The motors MG1 and MG2 transmit electric power to and from a battery 50 via inverters 41 and 42. Power lines 54 that connect the inverters 41 and 42 with the battery 50 are constructed as a positive electrode bus line and a negative electrode bus line shared by the inverters 41 and 42. This arrangement enables the electric power generated by one of the motors MG1 and MG2 to be consumed by the other motor. The battery 50 is charged with a surplus of the electric power generated by the motor MG1 or MG2 and is discharged to supplement an insufficiency of the electric power. When the power balance is attained between the motors MG1 and MG2, the battery 50 is neither charged nor discharged. Operations of both the motors MG1 and MG2 are controlled by a motor electronic control unit (hereafter referred to as motor ECU) 40. The motor ECU 40 receives diverse signals required for controlling the operations of the motors MG1 and MG2, for example, signals from rotational position detection sensors 43 and 44 that detect the rotational positions of rotors in the motors MG1 and MG2 and phase currents applied to the motors MG1 and MG2 and measured by current sensors (not shown). The motor ECU 40 outputs switching control signals to the inverters 41 and 42. The motor ECU 40 communicates with the hybrid electronic control unit 70 to control operations of the motors MG1 and MG2 in response to control signals transmitted from the hybrid electronic control unit 70 while outputting data relating to the operating conditions of the motors MG1 and MG2 to the hybrid electronic control unit 70 according to the requirements.

The battery 50 is under control of a battery electronic control unit (hereafter referred to as battery ECU) 52. The battery ECU 52 receives diverse signals required for control of the battery 50, for example, an inter-terminal voltage measured by a voltage sensor (not shown) disposed between terminals of the battery 50, a charge-discharge current measured by a current sensor (not shown) attached to the power line 54 connected with the output terminal of the battery 50, and a battery temperature measured by a temperature sensor (not shown) attached to the battery 50. The battery ECU 52 outputs data relating to the state of the battery 50 to the hybrid electronic control unit 70 via communication according to the requirements. The battery ECU 52 calculates a state of charge (SOC) of the battery 50, based on the accumulated charge-discharge current measured by the current sensor, for control of the battery 50.

The hybrid electronic control unit 70 is constructed as a microprocessor including a CPU 72, a ROM 74 that stores processing programs, a RAM 76 that temporarily stores data, and a non-illustrated input-output port, and a non-illustrated communication port. The hybrid electronic control unit 70 receives various inputs via the input port: an ignition signal from an ignition switch 80, a gearshift position SP from a gearshift position sensor 82 that detects the current position of a gearshift lever 81, an accelerator opening Acc from an accelerator pedal position sensor 84 that measures a step-on amount of an accelerator pedal 83, a brake pedal position BP from a brake pedal position sensor 86 that measures a step-on amount of a brake pedal 85, and a vehicle speed V from a vehicle speed sensor 88. The hybrid electronic control unit 70 communicates with the engine ECU 24, the motor ECU 40, and the battery ECU 52 via the communication port to transmit diverse control signals and data to and from the engine ECU 24, the motor ECU 40, and the battery ECU 52, as mentioned previously.

The hybrid vehicle 20 of the first embodiment thus constructed calculates a torque demand to be output to the ring gear shaft 32*a* functioning as the drive shaft, based on observed values of a vehicle speed V and an accelerator opening Acc, which corresponds to a driver's step-on amount of an accelerator pedal 83. The engine 22 and the motors MG1 and MG2 are subjected to operation control to output a required level of power corresponding to the calculated torque demand to the ring gear shaft 32*a*. The operation control of the engine 22 and the motors MG1 and MG2 selectively effectuates one of a torque conversion drive mode, a charge-discharge drive mode, and a motor drive mode. The torque conversion drive mode controls the operations of the engine 22 to output a quantity of power equivalent to the required level of power, while driving and controlling the motors MG1 and MG2 to cause all the power output from the engine 22 to be subjected to torque conversion by means of the power distribution integration mechanism 30 and the motors MG1 and MG2 and output to the ring gear shaft 32*a*. The charge-discharge drive mode controls the operations of the engine 22 to output a quantity of power equivalent to the sum of the required level of power and a quantity of electric power consumed by charging the battery 50 or supplied by discharging the battery 50, while driving and controlling the motors MG1 and MG2 to cause all or part of the power output from the engine 22 equivalent to the required level of power to be subjected to torque conversion by means of the power distribution integration mechanism 30 and the motors MG1 and MG2 and output to the ring gear shaft 32*a*, simultaneously with charge or discharge of the battery 50. The motor drive mode stops the operations of the engine 22 and drives and controls the motor MG2 to output a quantity of power equivalent to the required level of power to the ring gear shaft 32*a*.

Figure 2:
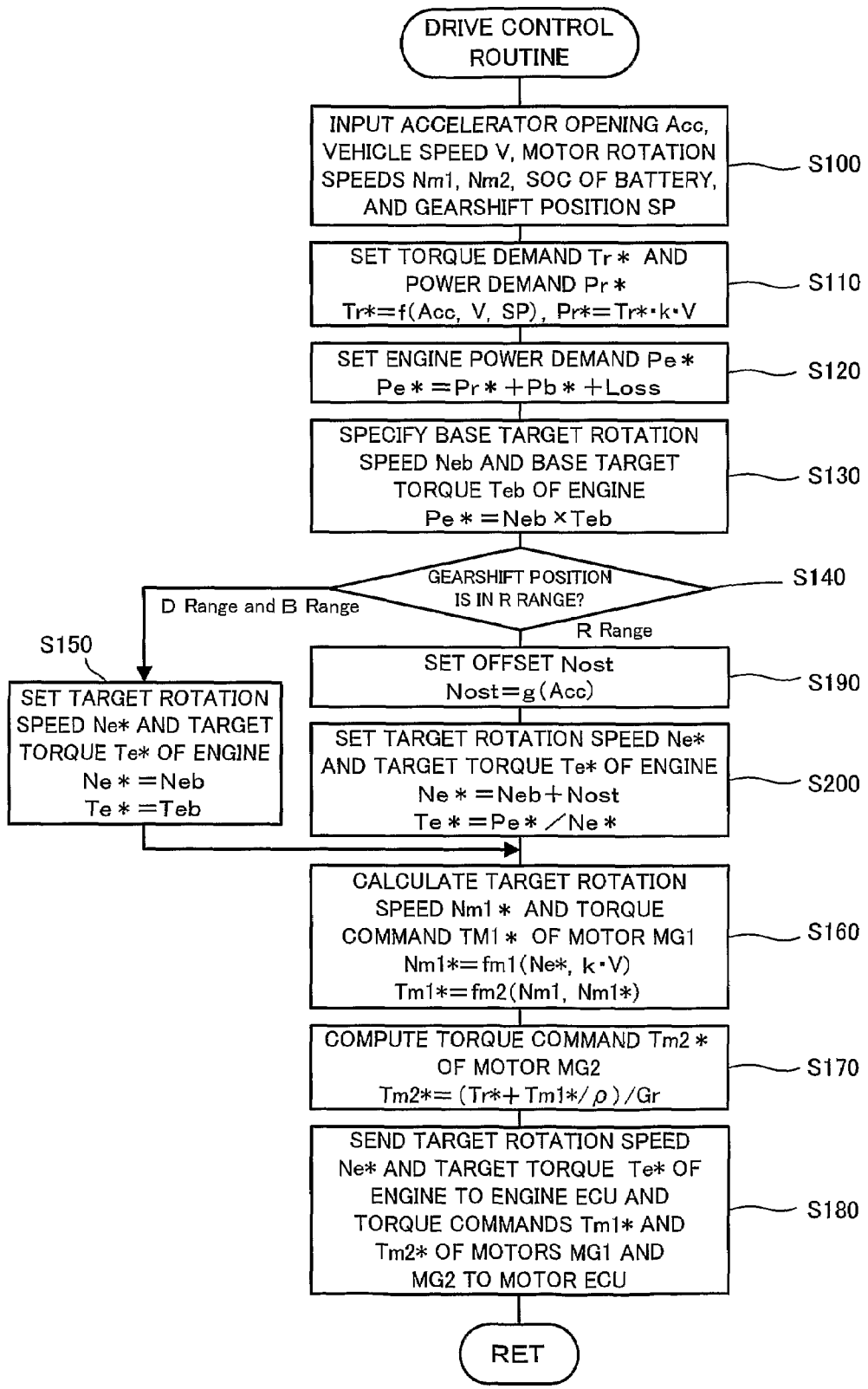
FIG. 2 is a flowchart showing a drive control routine executed by a hybrid electronic control unit included in the hybrid vehicle of the first embodiment.

The description now regards the operations of the hybrid vehicle 20 of the first embodiment having the configuration discussed above and more specifically a series of control operations for reverse drive with power output from the engine 22. FIG. 2 is a flowchart showing a drive control routine executed by the hybrid electronic control unit 70 in the hybrid vehicle 20 of the first embodiment. This drive control routine is carried out repeatedly at preset time intervals (for example, at every 8 msec) during operation of the engine 22.

In the drive control routine, the CPU 72 of the hybrid electronic control unit 70 first inputs various data required for control, that is, the accelerator opening Acc from the accelerator pedal position sensor 84, the vehicle speed V from the vehicle speed sensor 88, rotation speeds Nm1 and Nm2 of the motors MG1 and MG2, the state of charge SOC of the battery 50, and the gearshift position SP from the gearshift position sensor 82 (step S100). The rotation speeds Nm1 and Nm2 of the motors MG1 and MG2 are computed from the rotational positions of the respective rotors in the motors MG1 and MG2 detected by the rotational position detection sensors 43 and 44 and are received from the motor ECU 40 by communication.

Figure 3:
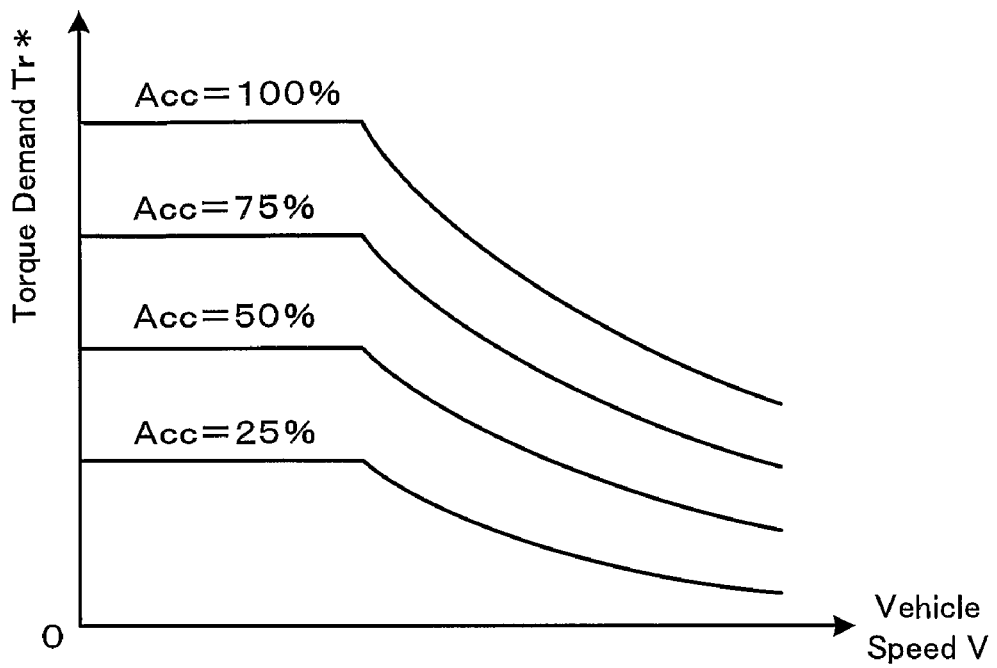
FIG. 3 shows one example of a torque demand setting map.
Figure 3:
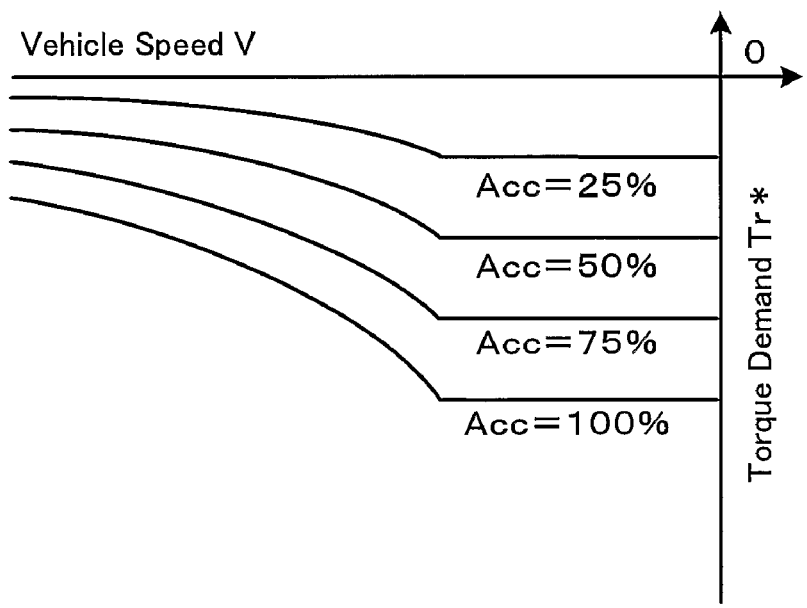

After the data input, the CPU 72 sets a torque demand Tr* to be output to the ring gear shaft 32a or the drive shaft linked to drive wheels 63a and 63b and a power demand Pr* of the ring gear shaft 32a, based on the input accelerator opening Acc, the input vehicle speed V, and the input gearshift position SP (step S110). A concrete procedure of setting the torque demand Tr* in this embodiment stores in advance variations in torque demand Tr* against the accelerator opening Acc, the vehicle speed V, and the gearshift position SP as a torque demand setting map in the ROM 74 and reads the torque demand Tr* corresponding to the given accelerator opening Acc, the given vehicle speed V, and the given gearshift position SP from the map. One example of the torque demand setting map is shown in FIG. 3. FIG. 3(a) shows the torque demand setting map in the gearshift position SP set to a forward drive range (D range) or a brake range (B range), and FIG. 3(b) shows the torque demand setting map in the gearshift position SP set to a reverse drive range (R range). In this embodiment, the torque and the vehicle speed in the forward drive direction have positive values. The positive torque demand Tr* and the positive vehicle speed V are accordingly given in the D range and in the B range, whereas the negative torque demand Tr* and the negative vehicle speed V are given in the R range. The power demand Pr* is the product of the torque demand Tr* and a rotation speed Nr of the ring gear shaft 32a. The rotation speed Nr of the ring gear shaft 32a is obtained by multiplying the vehicle speed V by a conversion coefficient k or by dividing the rotation speed Nm2 of the motor MG2 by a gear ratio Gr of the reduction gear 35.

Figure 4:
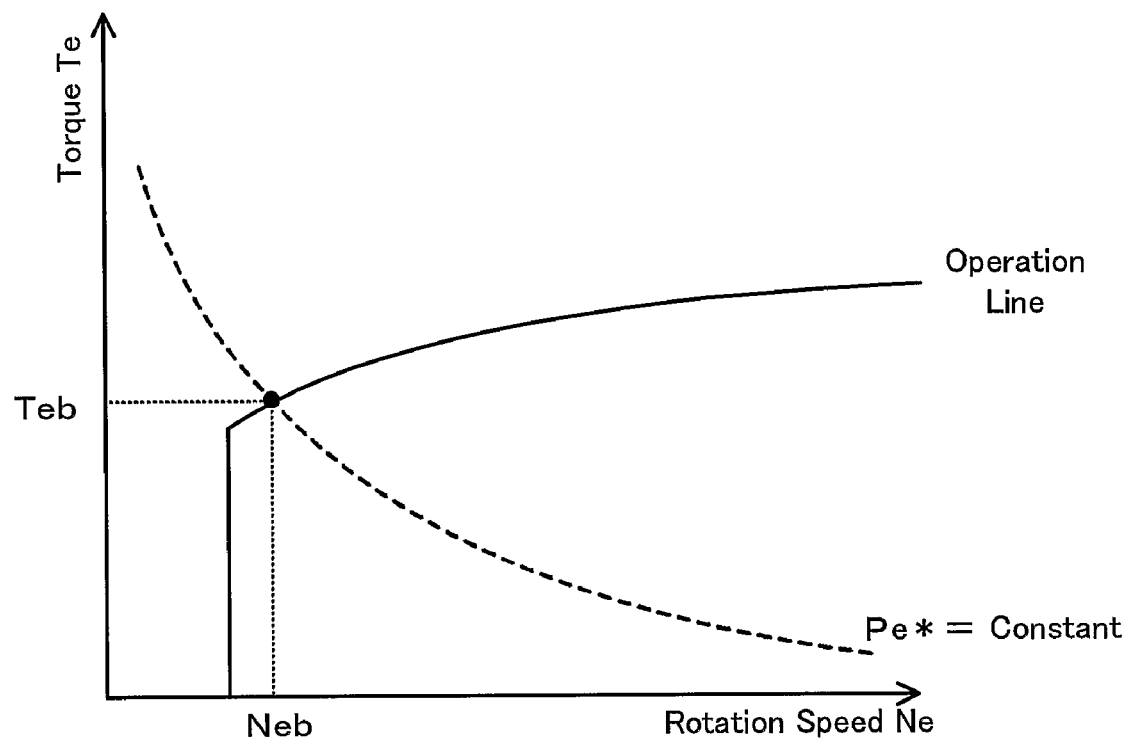
FIG. 4 shows a process of setting a base target rotation speed Neb and a base target torque Teb of an engine according to an operation line of the engine.

After setting the torque demand Tr* and the power demand Pr*, the CPU 72 calculates an engine power demand Pe* to be output from the engine 22 as the sum of power demand Pr*, the charge-discharge power demand Pb* of the battery 50, and a potential loss (step S120). The CPU 72 then specifies a base target rotation speed Neb and a base target torque Teb of an efficient drive point of the engine 22 corresponding to the calculated engine power demand Pe* (step S130). FIG. 4 shows a process of specifying the base target rotation speed Neb and the base target torque Teb according to an engine operation line that ensures efficient operation of the engine 22. As shown in FIG. 4, the base target rotation speed Neb and the base target torque Teb are given as an intersection between a curve of constant engine power demand Pe* and the operation line. The charge-discharge power demand Pb* of the battery 50 is set based on the current state of charge (SOC) of the battery 50 and the accelerator opening Acc.

The CPU 72 subsequently determines whether the gearshift position SP is set in the R (reverse) range, that is, whether a reverse drive is required, (step S140). When the gearshift position SP is set not in the R range but in either of the D (drive) range and the B (brake) range, the base target rotation speed Neb and the base target torque Teb specified at step S130 are directly set to a target rotation speed Ne* and a target torque Te* of the engine 22 (step S150).

The CPU 72 subsequently calculates a target rotation speed Nm1* of the motor MG1 from the target rotation speed Ne* of the engine 22, the rotation speed Nr (=k·V) of the ring gear shaft 32a, and a gear ratio ρ of the power distribution integration mechanism 30 according to Equation (1) given below, while calculating a torque command Tm1* of the motor MG1 from the calculated target rotation speed Nm1* and the current rotation speed Nm1* of the motor MG1 according to Equation (2) given below (step S160):

$$Nm1^* = (Ne^* \cdot (1+\rho) - k \cdot V)/\rho \quad (1)$$

$$Tm1^* = \text{Previous } Tm1^* + KP(Nm1^* - Nm1^*) + KI \int (Nm1^* - Nm1^*) dt \quad (2)$$

Figure 5:
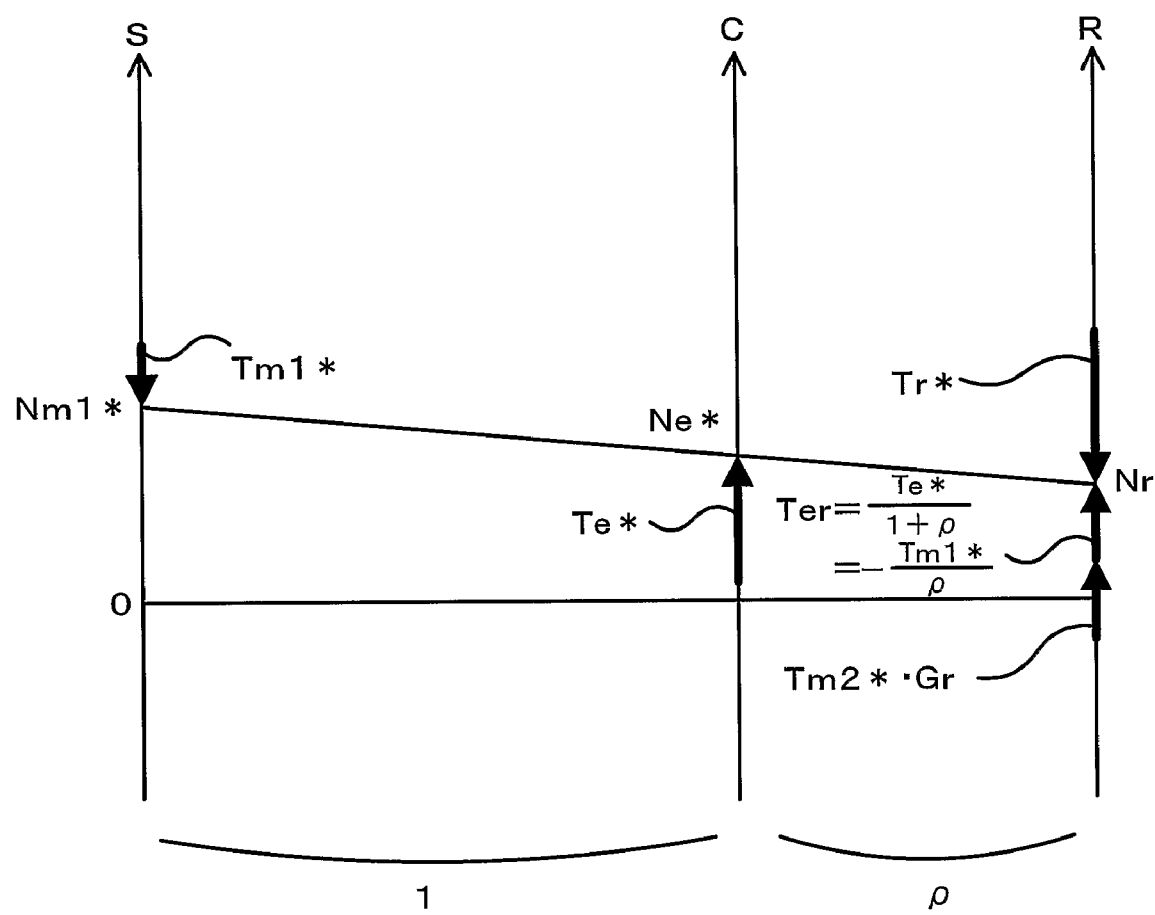
FIG. 5 is an alignment chart showing torque-rotation speed dynamics of respective rotation elements of a power distribution integration mechanism included in the hybrid vehicle of the first embodiment.

FIG. 5 is an alignment chart showing torque-rotation speed dynamics of the respective rotation elements included in the power distribution integration mechanism 30. The left axis S, the center axis C, and the right axis R respectively represent the rotation speed of the sun gear 31, the rotation speed of the carrier 34, and the rotation speed Nr of the ring gear 32 (ring tear shaft 32a). Two thick arrows on the axis R in FIG. 5 respectively show a torque that is directly transmitted to the ring gear shaft 32a (hereafter referred to as direct torque Ter) when the torque Te* is output from the engine 22 in steady operation at a specific drive point of the target rotation speed Ne* and the target torque Te*, and a torque that is applied to the ring gear shaft 32a when a torque Tm2* is output from the motor MG2. As mentioned above, the rotation speed of the sung gear 31 is equivalent to the rotation speed Nm1* of the motor MG1, and the rotation speed of the carrier 34 is equivalent to the rotation speed Ne of the engine 22. The target rotation speed Nm1* of the motor MG1 is accordingly computable from the rotation speed Nr (=k·V) of the ring gear shaft 32a, the target rotation speed Ne* of the engine 22, and the gear ratio ρ of the power distribution integration mechanism 30 according to Equation (1) given above. The drive control of the motor MG1 to be rotated at the target rotation speed Nm1* with the setting of the torque command Tm1* thus leads to rotation of the engine 22 at the target rotation speed Ne*. Equation (2) is a relational expression of feedback control to drive and rotate the motor MG1 at the target rotation speed Nm1*. In Equation (2) given above, 'KP' in the second term and 'KI' in the third term on the right side respectively denote a gain of the proportional and a gain of the integral term.

After calculation of the target rotation speed Nm1* and the torque command Tm1* of the motor MG1, the CPU 72 computes a torque command Tm2* to be output from the motor MG2 for application of the torque demand Tr* to the ring gear shaft 32a according to Equation (3) given below (step S170):

$$Tm2^* = (Tr^* - Te^*)/(1+\rho))/Gr = (Tr^* + Tm1^*/\rho)/Gr \quad (3)$$

Equation (3) reflects the torque balance on the axis R in the alignment chart of FIG. 5. The torque command Tm2* of the motor MG2 is calculated from the torque demand Tr*, the torque command Tm1* of the motor MG1, the gear ratio ρ of the power distribution integration mechanism 30, and the gear ratio Gr of the reduction gear 35.

The CPU 72 sends the target rotation speed Ne* and the target torque Te* of the engine 22 to the engine ECU 24, while sending the torque commands Tm1* and Tm2* of the motors MG1 and MG2 to the motor ECU 40 (step S180), before exiting from the drive control routine. The engine ECU 24 receives the target rotation speed Ne* and the target torque Te* and executes fuel injection control and ignition control of the engine 22 to drive the engine 22 at a specified drive point of the target rotation speed Ne* and the target torque Te*. The motor ECU 40 receives the torque commands Tm1* and Tm2* and executes switching control of the switching elements included in the respective inverters 41 and 42 to drive the motor MG1 with the torque command Tm1* and the motor MG2 with the torque command Tm2*.

Figure 6:
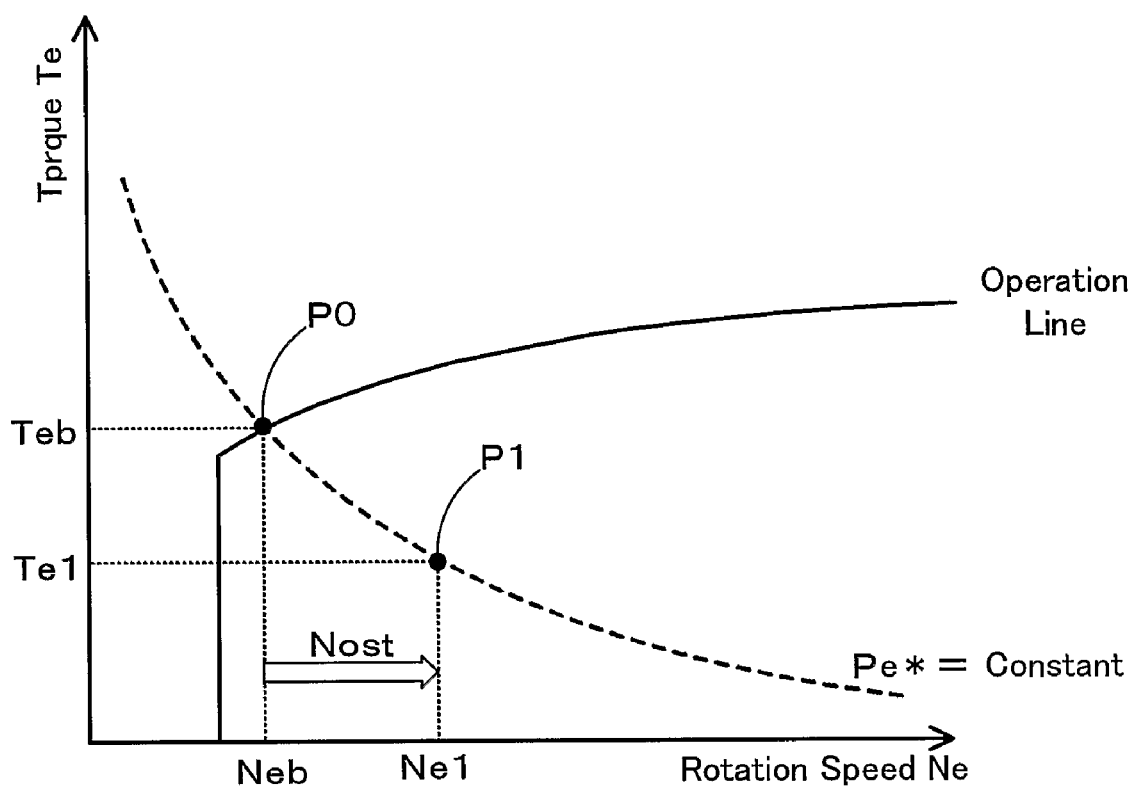
FIG. 6 shows a process of setting a target rotation speed Ne* and a target torque Te* of the engine in a reverse driving state.
Figure 7:
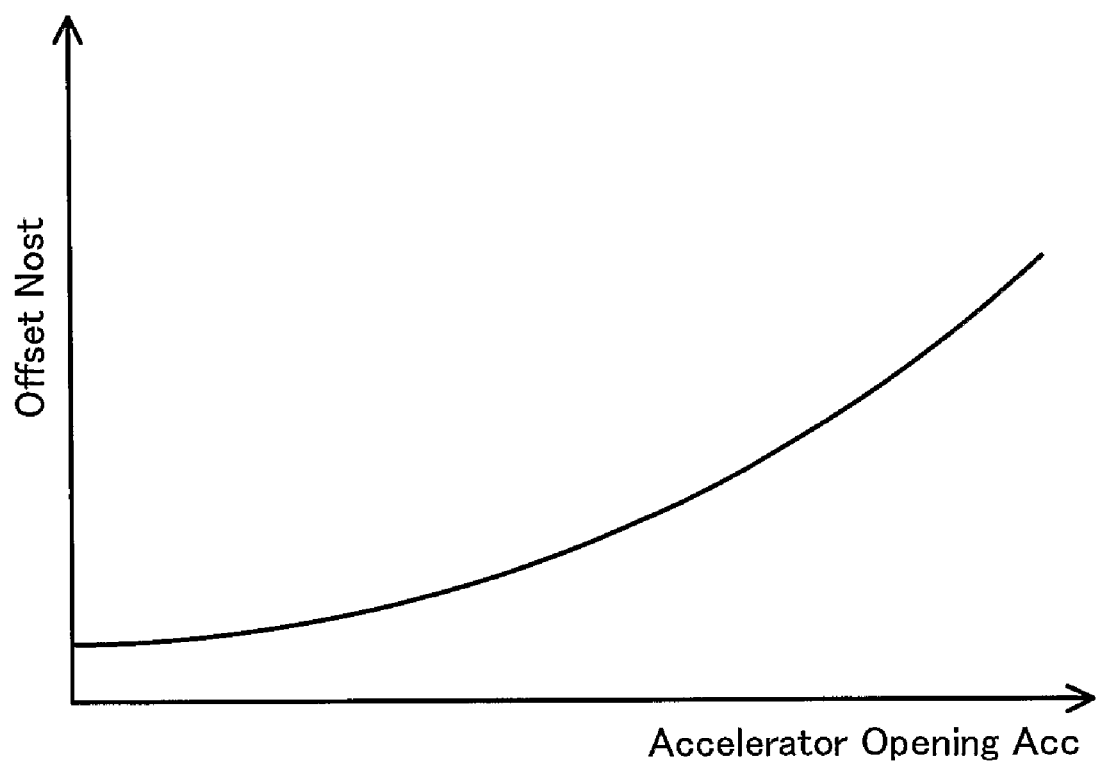
FIG. 7 is a map showing a variation in offset Nost against the accelerator opening Acc.

When it is determined at step S140 that the gearshift position SP is in the R range (a reverse drive is required), on the other hand, the CPU 72 sets an offset Nost for the base target rotation speed Neb, which is specified at step S130, corresponding to the accelerator opening Acc (step S190). The CPU 72 then sets the sum of the offset Nost and the base target rotation speed Neb to the target rotation speed Ne* of the engine 22, while setting the division of the engine power demand Pe* by the target engine rotation speed Ne* to the target torque Te* of the engine 22 (step S200). These settings of the target rotation speed Ne* and the target torque Te* specify a drive point of the engine 22 for a reverse drive. The CPU 72 subsequently sets the target rotation speed Nm1* and the torque command Tm1* of the motor MG1 and the torque command Tm2* of the motor MG2 to drive the engine 22 at the specified drive point and to ensure output of the torque demand Tr* to the ring gear shaft 32a or the drive shaft, and controls the operations of the engine 22 and the motors MG1 and MG2 in the same manner as described above (steps S160 to S180). FIG. 6 shows a process of setting the target rotation speed Ne* and the target torque Te* of the engine 22 in a reverse driving state. In the reverse driving state, the target rotation speed Ne* and the target torque Te* are given at a drive point P1, which has an increase in target rotation speed Ne* by the offset Nost from an efficient drive point P0 of the engine 22 while keeping the engine power demand Pe* unchanged. A concrete procedure of setting the offset Nost in this embodiment stores in advance a variation in offset Nost against the accelerator opening Acc as a map in the ROM 74 and reads the offset Nost corresponding to the given accelerator opening Acc from the map. One example of this map is shown in FIG. 7. The offset Nost is set to increase with an increase in accelerator opening Acc. In the reverse driving state, the target rotation speed Ne* of the engine 22 is set to increase with an increase in accelerator opening Acc, whereas the target torque Te* is set to decrease with the increase in accelerator opening Acc.

Figure 8:
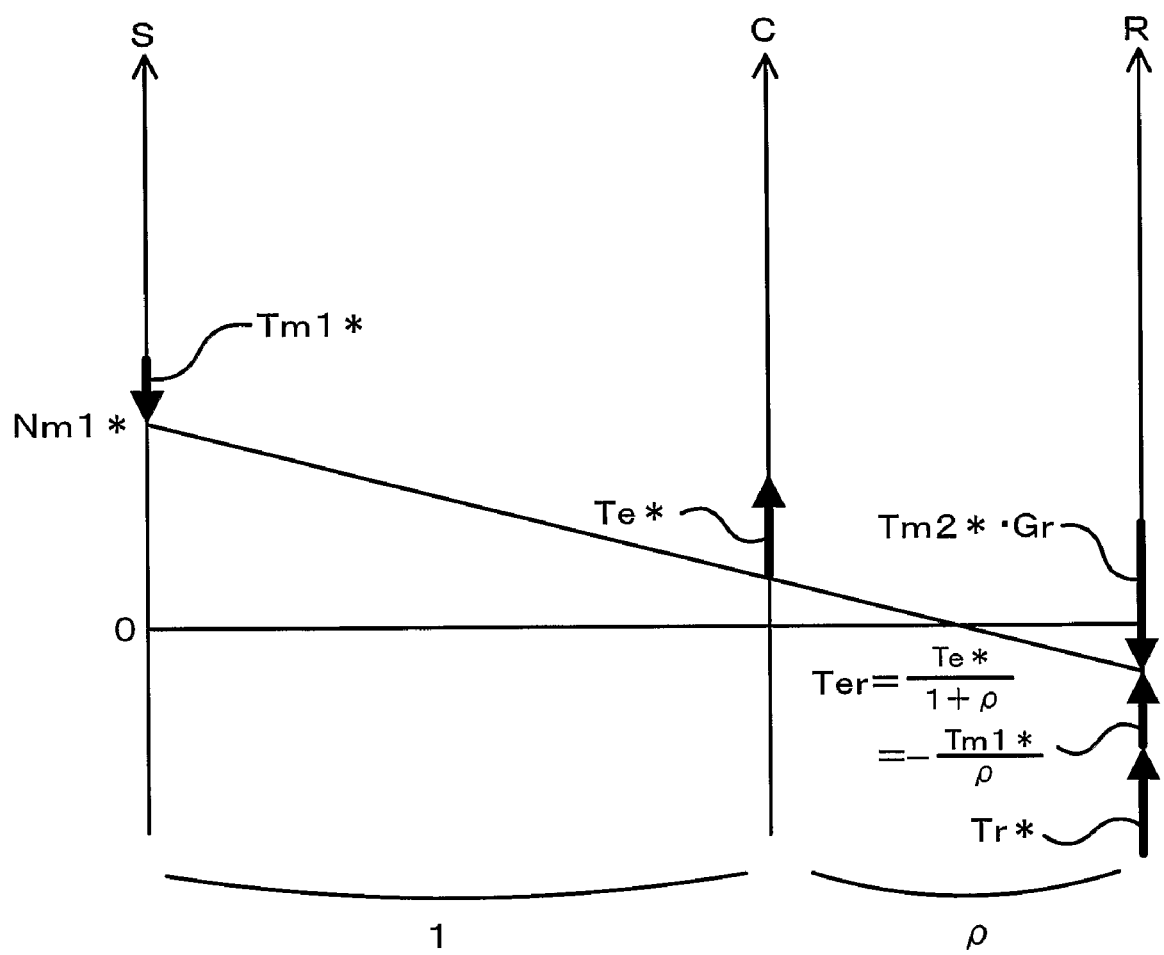
FIG. 8 is an alignment chart showing torque-rotation speed dynamics of the respective rotation elements of the power distribution integration mechanism in the reverse driving state.

FIG. 8 is an alignment chart showing torque-rotation speed dynamics of the respective rotation elements of the power distribution integration mechanism 30 in the reverse driving state. In a reverse drive with the power output from the engine 22, the motor MG2 is required to output a torque corresponding to the sum of the torque demand Tr* and the direct torque Ter (=Te*/(1+ρ)=−Tm1*/ρ) that is directly transmitted from the engine 22 to the ring gear shaft 32a. The absolute maximum torque output to the ring gear shaft 32a is accordingly smaller than the absolute maximum rated torque of the motor MG2. The procedure of this embodiment sets a relatively high rotation speed to the target rotation speed Ne* of the engine 22 corresponding to a relatively high level of the accelerator opening Acc. This setting reduces the target torque Te* and the direct torque Ter of the engine 22. Under the conditions of output of a fixed power from the engine 22 and output of a fixed torque from the motor MG2, this increases the torque applied to the ring gear shaft 32a to a level close to the maximum rated torque of the motor MG2. Namely a relatively large torque corresponding to the accelerator opening Acc is applied to the ring gear shaft 32a. A relatively low level of the accelerator opening Acc, on the other hand, does not require output of a large torque to the ring gear shaft 32a or the drive shaft. Setting a relatively low rotation speed to the target rotation speed Ne* of the engine 22 (that is, setting a relatively high torque to the target torque Te* of the engine 22) effectively prevents the engine 22 from being driven at a high rotation speed against the relatively low level of the accelerator opening Acc. The engine 22 can thus be driven at the driver's expected rotation speed corresponding to the accelerator opening Acc with the ensured output of the torque demand Tr* to the ring gear shaft 32a. Because of this reason, the target rotation speed Ne* of the engine 22 is set to increase with an increase in accelerator opening Acc.

As described above, in the reverse driving state, the hybrid vehicle 20 of the first embodiment sets the target rotation speed Ne* and the target torque Te* of the engine 22 to a drive point of the higher engine rotation speed corresponding to the higher accelerator opening Acc selected among available drive points of the engine 22 that ensure output of the engine power demand Pe*. The engine 22 and the motors MG1 and MG2 are controlled to drive the engine 22 at the set drive point and to ensure output of the torque demand Tr* to the ring gear shaft 32a or the drive shaft. Namely the engine 22 can be driven at the driver's expected drive point corresponding to the accelerator opening Acc with the ensured output of the torque demand Tr* to the ring gear shaft 32a. This arrangement of the embodiment desirably improves the drive feeling in the reverse driving state.

In the reverse driving state, the hybrid vehicle 20 of the first embodiment sets the base target rotation speed Neb and the base target torque Teb as an efficient drive point of the engine 22 corresponding to the engine power demand Pe*, and sets the offset Nost, which increases with an increase in accelerator opening Acc. The target rotation speed Ne* and the target torque Te* of the engine 22 are then given at a drive point, which has an increase in target rotation speed Ne* by the offset Nost from the base target rotation speed Neb while keeping the engine power demand Pe* unchanged. The addition of the offset Nost to set the target rotation speed Ne* is, however, not essential. The requirement is setting the target rotation speed Ne* and the target torque Te* of the engine 22 to a drive point of the higher engine rotation speed corresponding to the higher accelerator opening Acc selected among available drive points of the engine 22 that ensure output of the engine power demand Pe*. One modified procedure may directly set the target rotation speed Ne* and the target torque Te* of the engine 22 corresponding to the engine power demand Pe* and the accelerator opening Acc.

In the reverse driving state, the hybrid vehicle 20 of the first embodiment sets the target rotation speed Ne* and the target torque Te* of the engine 22 to a drive point of the higher engine rotation speed corresponding to the higher accelerator opening Acc selected among available drive points of the engine 22 that ensure output of the engine power demand Pe*. The drive point may depend upon the torque demand Tr*, instead of the accelerator opening Acc. One possible modification may thus set the target rotation speed Ne* and the target torque Te* of the engine 22 to a drive point of the higher engine rotation speed corresponding to the higher torque demand Tr*.

The hybrid vehicle 20 of the first embodiment controls the engine 22 to be driven at a drive point (defined by the combination of the rotation speed and the torque) having the higher rotation speed corresponding to the higher accelerator opening Acc, regardless of the level of the vehicle speed V.

The driver does not feel significant discomfort due to inconsistency of the variation in rotation speed Ne of the engine 22 with the driver's operation in a relatively high range of the vehicle speed V. One modified procedure may thus control the engine 22 to be driven at a drive point of the higher rotation speed corresponding to the higher accelerator opening Acc only in a relatively low range of the vehicle speed V. At the relatively high level of the vehicle speed V, the procedure may execute the processing of steps S150, in place of the processing of steps S190 and S200 in the drive control routine of FIG. 2.

In the reverse driving state, the hybrid vehicle 20 of the first embodiment sets the base target rotation speed Neb and the base target torque Teb of the engine 22 given as the intersection between the curve of constant engine power demand Pe* and the operation line of efficient drive points of the engine 22 (fuel consumption-based operation line), and sets the offset Nost corresponding to the accelerator opening Acc. The target rotation speed Ne* and the target torque Te* of the engine 22 are then set to a drive point having an increase in target rotation speed Ne* by the offset Nost from the combination of the base target rotation speed Neb and the base target torque Teb. One possible modification may set a reverse drive operation line, which is selected corresponding to the accelerator opening Acc and has a shift toward the lower torque than the fuel consumption-based operation line, to an active operation line and may set the target rotation speed Ne* and the target torque Te* of the engine 22 based on the engine power demand Pe* and the active operation line. In this case, the drive control routine of FIG. 2 is replaced by a modified drive control routine of FIG. 9. This modification is described below with reference to the drive control routine of FIG. 9.

Figure 9:
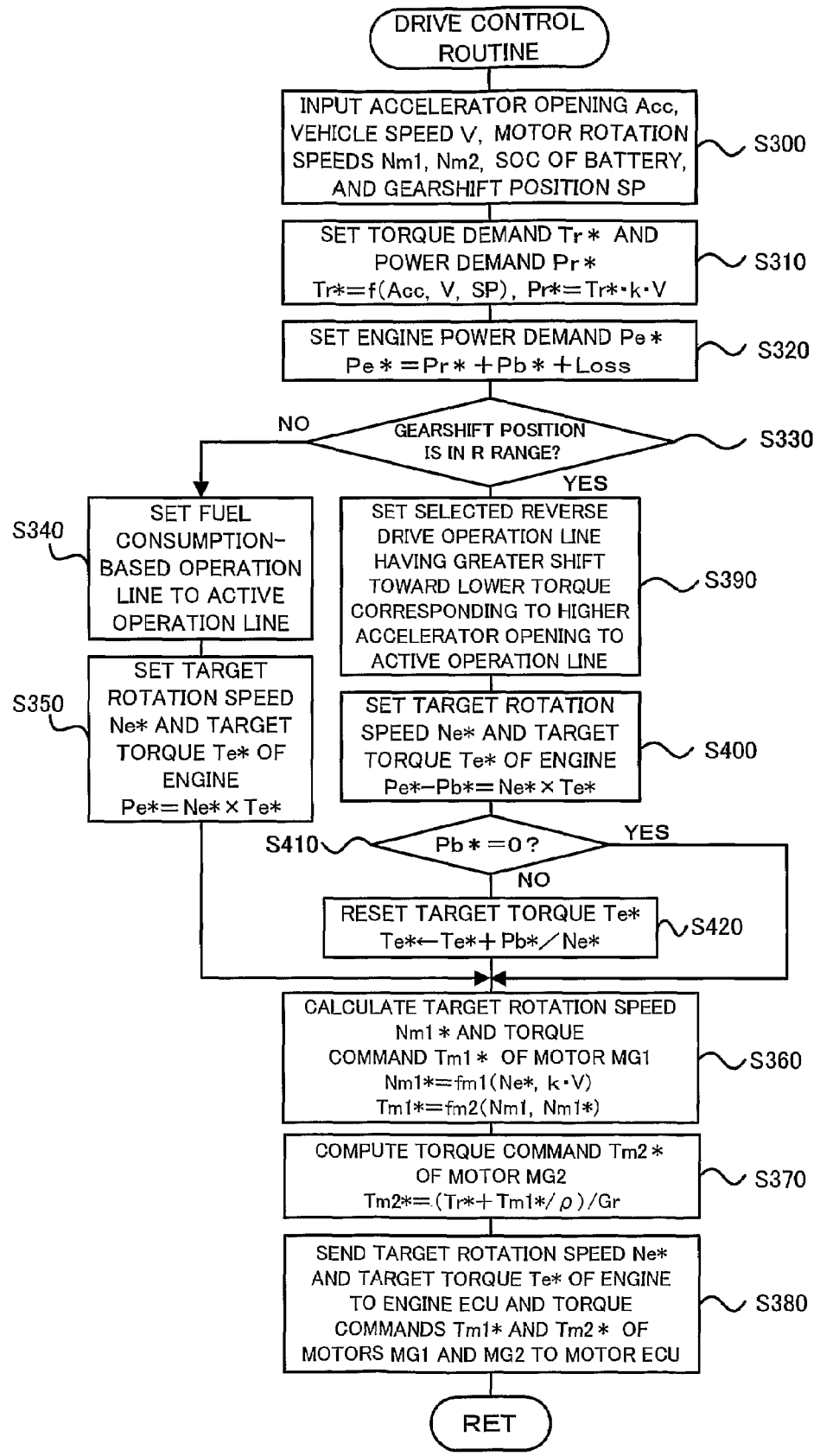
FIG. 9 is a flowchart showing a modified drive control routine.

In the modified drive control routine of FIG. 9, the CPU 72 of the hybrid electronic control unit 70 executes the processing of steps S300 to S320, which is equivalent to the processing of steps S100 to S120 in the drive control routine of the first embodiment shown in FIG. 2. The CPU 72 first inputs various data required for control, that is, the accelerator opening Acc, the vehicle speed V, the rotation speeds Nm1* and Nm2 of the motors MG1 and MG2, the state of charge SOC of the battery 50, and the gearshift position SP (step S300). The CPU 72 then sets the torque demand Tr* to be output to the ring gear shaft 32a or the drive shaft and the power demand Pr* of the ring gear shaft 32a, based on the input accelerator opening Acc, the input vehicle speed V, and the input gearshift position SP (step S310). The CPU 72 subsequently calculates the engine power demand Pe* to be output from the engine 22 as the sum of power demand Pr*, the charge-discharge power demand Pb* of the battery 50, and a potential loss (step S320). The details of the process of setting the torque demand Tr*, the power demand Pr*, and the engine power demand Pe* have been described above in the first embodiment.

The CPU 72 then determines whether the gearshift position SP is set in the R (reverse) range (step S330). When the gearshift position SP is set not in the R range but in either of the D (drive) range and the B (brake) range, the operation line of efficient drive points of the engine 22 (fuel consumption-based operation line) shown in FIG. 6 is set to an active operation line (step S340). The target rotation speed Ne* and the target torque Te* of the engine 22 are set to the intersection between the active operation line and the curve of constant engine power demand Pe* (step S350).

Figure 10:
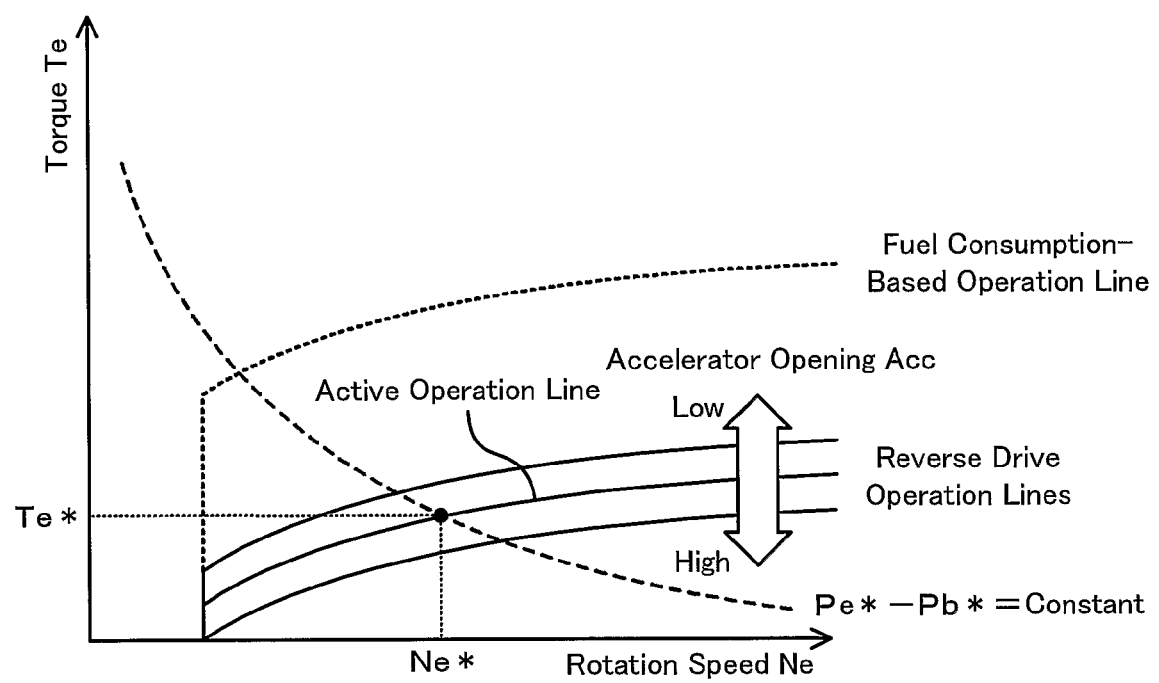
FIG. 10 shows multiple reverse drive operation lines and a process of setting the target rotation speed Ne* and the target torque Te* of the engine.
Figure 11:
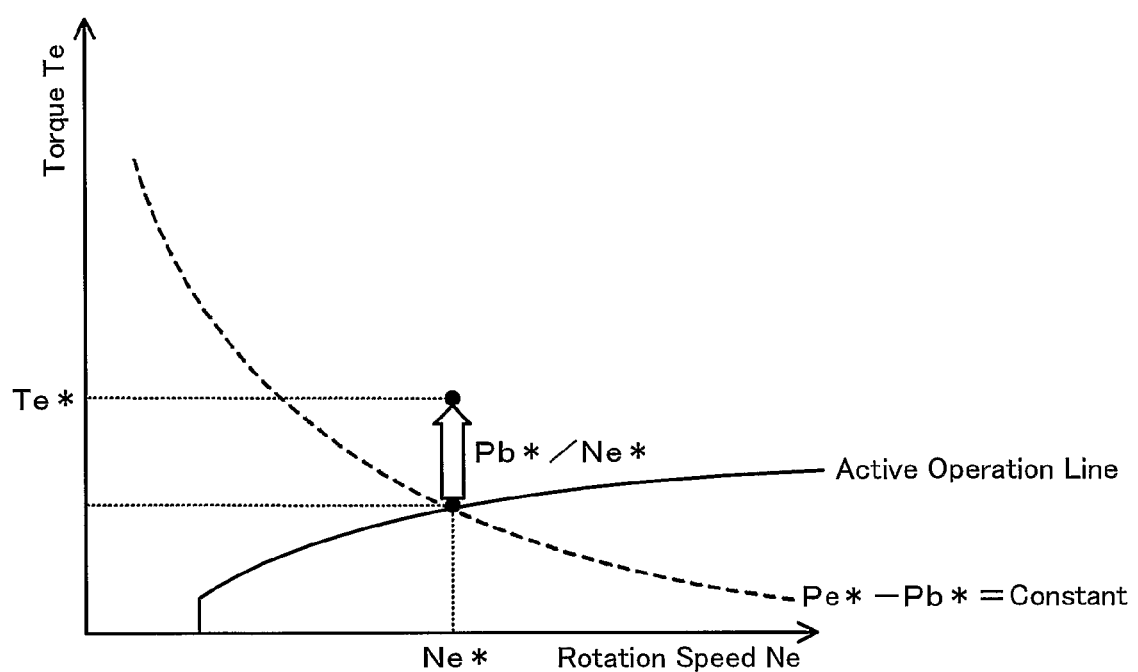
FIG. 11 shows a process of resetting the target torque Te* of the engine.

When the gearshift position SP is in the R (reverse) range, on the other hand, the CPU 72 selects a reverse drive operation line having a greater shift toward the lower torque corresponding to the higher accelerator opening Acc among multiple reverse drive operation lines and sets the selected reverse drive operation line to the active operation line (step S390). The target rotation speed Ne* and the target torque Te* of the engine 22 are set based on the active operation line and a calculated power difference (Pe*−Pb*) by subtraction of the charge-discharge power demand Pb* of the battery 50 from the engine power demand Pe* (step S400). FIG. 10 shows multiple reverse drive operation lines and a process of setting the target rotation speed Ne* and the target torque Te* of the engine 22. As shown in FIG. 10, the target rotation speed Ne* and the target torque Te* of the engine 22 are set to an intersection between the active operation line selected among the multiple reverse drive operation lines and a constant curve of the power difference (Pe*−Pb*) by subtraction of the charge-discharge power demand Pb* of the battery 50 from the engine power demand Pe*. A reverse drive operation line having a greater shift toward the lower torque is selected corresponding to the higher accelerator opening Acc and is set to the active operation line. The target rotation speed Ne* and the target torque Te* of the engine 22 are accordingly set to a drive point of the higher rotation speed corresponding to the higher accelerator opening Acc. The CPU 72 then determines whether the charge-discharge power demand Pb* of the battery 50 is equal to 0, that is, whether charge or discharge of the battery 50 is required (step S410). When the charge-discharge power demand Pb* is equal to 0, the drive control routine skips the processing of step S420 and goes to step S360. When the charge-discharge power demand Pb* is not equal to 0, on the other hand, the target torque Te* of the engine 22 is reset to the sum of the target torque Te* set at step S400 and division of the charge-discharge power demand Pb* by the target rotation speed Ne* set at step S400 (step S420) FIG. 11 shows a process of resetting the target torque Te* of the engine 22. The procedure of this modified drive control routine first sets the target rotation speed Ne* and the target torque Te* of the engine 22 based on the selected active operation line and the power difference (Pe*−Pb*) by subtraction of the charge-discharge power demand Pb* of the battery 50 from the engine power demand Pe*. The procedure then resets the target torque Te* by addition of the division (Pb*/Ne*) of the charge-discharge power demand Pb* by the target rotation speed Ne*. This arrangement ensures substantially constant drive feeling (rotation speed Ne) of the engine 22 corresponding to the accelerator opening Acc, regardless of a charge-discharge request to the battery 50.

After setting the target rotation speed Ne* and the target torque Te* of the engine 22, this modified drive control routine executes the processing of steps S360 to S380, which is equivalent to the processing of steps S160 to S180 in the drive control routine of the first embodiment shown in FIG. 2. The CPU 72 calculates the target rotation speed Nm1* of the motor MG1 according to Equation (1) given above to drive the engine 22 at the target rotation speed Ne* and calculates the torque command Tm1* to be output from the motor MG1 according to Equation (2) given above (step S360). The CPU 72 then computes the torque command Tm2* to be output from the motor MG2 from the torque demand Tr* and the torque command Tm1* according to Equation (3) given above (step S370), and sends the respective settings to the engine ECU 24 and the motor ECU 40 (step S380). The engine 22 and the motors MG1 and MG2 are driven and controlled as discussed in the first embodiment.

In the reverse driving state, this modified procedure selects a reverse drive operation line having a greater shift toward the lower torque corresponding to the higher accelerator opening Acc among multiple reverse drive operation lines and sets the selected reverse drive operation line to the active operation line. The target rotation speed Ne* and the target torque Te* of the engine 22 are set according to the active operation line. The engine 22 can thus be driven at a drive point of the higher rotation speed corresponding to the higher accelerator opening Acc. This arrangement improves the drive feeling in the reverse driving state, like the hybrid vehicle 20 of the first embodiment.

B. Second Embodiment

Figure 12:
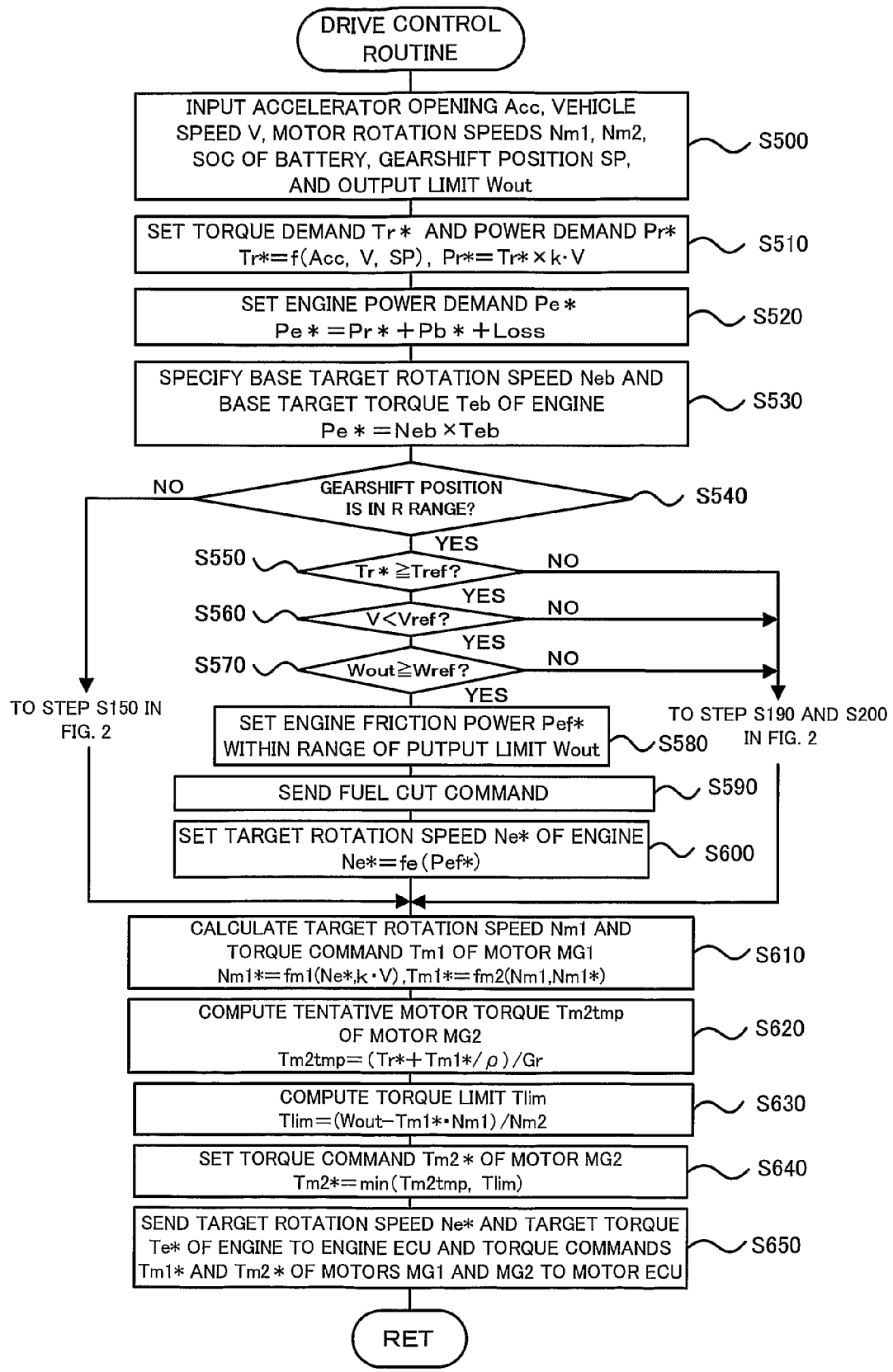
FIG. 12 is a flowchart showing a drive control routine executed by the hybrid electronic control unit included in a hybrid vehicle of a second embodiment.

A hybrid vehicle 20B is described below as a second embodiment of the invention. The hybrid vehicle 20B of the second embodiment has the identical hardware configuration with that of the hybrid vehicle 20 of the first embodiment. The constituents and elements of the hybrid vehicle 20B of the second embodiment identical with those of the hybrid vehicle 20 of the first embodiment are thus expressed by the like numerals and symbols and are not specifically described here. FIG. 12 is a flowchart showing a drive control routine executed by the hybrid electronic control unit 70 included in the hybrid vehicle 20B of the second embodiment. This drive control routine is carried out repeatedly at preset time intervals (for example, at every 8 msec) during operation of the engine 22.

In the drive control routine of the second embodiment, the CPU 72 of the hybrid electronic control unit 70 first inputs various data required for control, that is, the accelerator opening Acc, the vehicle speed V, the rotation speeds Nm1* and Nm2 of the motors MG1 and MG2, the state of charge SOC of the battery 50, the gearshift position SP, and an output limit Wout of the battery 50 (step S500). The output limit Wout of the battery 50 is set based on the observed state of charge (SOC) and the measured temperature Tb of the battery 50 and is received from the battery ECU 52 by communication. The battery temperature Tb deviated from its appropriate temperature range and the lower state of charge (SOC) lead to the lower output limit Wout of the battery 50.

After the data input, the CPU 72 executes the processing of steps S510 to S530, which is equivalent to the processing of steps S110 to S130 in the drive control routine of the first embodiment shown in FIG. 2. The CPU 72 sets the torque demand Tr* and the power demand Pr*, based on the input accelerator opening Acc, the input vehicle speed V, and the input gearshift position SP (step S510), calculates the engine power demand Pe* to be output from the engine 22 as the sum of the power demand Pr*, the charge-discharge power demand Pb* of the battery 50, and a potential loss (step S520), and specifies the base target rotation speed Neb and the base target torque Teb corresponding to the calculated engine power demand Pe* (step S530).

The CPU 72 then determines whether the gearshift position SP is set in the R (reverse) range (step S540). When the gearshift position SP is set not in the R range but in either of the D (drive) range and the B (brake) range, the base target rotation speed Neb and the base target torque Teb specified at step S530 are directly set to the target rotation speed Ne* and the target torque Te* of the engine 22. This is equivalent to the processing of step S150 in the drive control routine of the first embodiment shown in FIG. 2. When it is determined at step S540 that the gearshift position SP is set in the R (reverse) range, on the other hand, the CPU 72 successively determines whether the torque demand Tr* is not lower than a preset reference torque Tref (step S550), whether the vehicle speed V is lower than a preset reference speed Vref (step S560), and whether the output limit Wout is not less than a preset reference output Wref (step S570). The preset reference torque Tref, the preset reference speed Vref, and the preset reference output Wref depend upon the performances of the motor MG2 and the battery 50 and are used as criteria for application of engine friction to an assist torque in a reverse drive by motoring the engine 22 with the motor MG1, (discussed later). When the torque demand Tr* is lower than the preset reference torque Tref at step S550 or when the vehicle speed V is not lower than the preset reference speed Vref at step S560, it is determined that there is no need of applying the engine friction to the assist torque in a reverse drive. When the output limit Wout is less than the preset reference output Wref at step S570, it is determined that application of the engine friction to the assist torque in a reverse drive causes an insufficient electric power level of the battery 50. With reference to the map of FIG. 7, the offset Nost for the base target rotation speed Neb is set corresponding to the accelerator opening Acc. The sum of the offset Nost and the base target rotation speed Neb gives the target rotation speed Ne* of the engine 22, while the division of the engine power demand Pe* by the target engine rotation speed Ne* gives the target torque Te* of the engine 22. Such settings are equivalent to the processing of steps S190 and S200 in the drive control routine of the first embodiment shown in FIG. 2.

When the torque demand Tr* is not lower than the preset reference torque Tref at step S550, when the vehicle speed V is lower than the preset reference speed Vref at step S560, and when the output limit Wout is not less than the preset reference output Wref at step S570, the CPU 72 sets an engine friction power Pef* within the range of the output limit Wout (step S580), sends a fuel cut command to the engine ECU 24 (step S590), and sets the target rotation speed Ne* of the engine 22 to satisfy the engine friction power Pef* (step S600). The fuel cut of the engine 22 sets the target torque Te* of the engine 22 to 0. The engine friction power Pef* is set by subtracting the maximum rated power of the motor MG2 from the power demand Pr* and restricting the power difference to the output limit Wout of the battery 50. A concrete procedure of setting the target rotation speed Ne* in this embodiment stores in advance a variation in target rotation speed Ne* against the engine friction power Pef* as a map in the ROM 74 and reads the target rotation speed Ne* corresponding to the given engine friction power Pef* from the map.

The CPU 72 calculates the target rotation speed Nm1* of the motor MG1 according to Equation (1) given above to drive the engine 22 at the target rotation speed Ne* and calculates the torque command Tm1* to be output from the motor MG1 according to Equation (2) given above (step S610). The CPU 72 then computes a tentative motor torque Tm2tmp to be output from the motor MG2 from the torque demand Tr* and the torque command Tm1* of the motor MG1 according to Equation (4) given below, which is equivalent to Equation (3) (step S620), and computes a torque limit Tlim of the motor MG2 from the output limit Wout, the torque command Tm1* of the motor MG1, and the rotation speeds Nm1* and Nm2 of the motors MG1 and MG2 according to Equation (5) given below (step S630):

$$Tm2tmp = (Tr^* + Tm1^*/\rho)/Gr \quad (4)$$

$$Tlim = (Wout - Tm1^* \cdot Nm1)/Nm2 \quad (5)$$

The smaller between the tentative motor torque Tm2tmp and the torque limit Tlim is set to the torque command Tm2* of the motor MG2 (step S640). This series of processing restricts the output torque level of the motor MG2 within the range of the output limit Wout of the battery 50.

Figure 13:
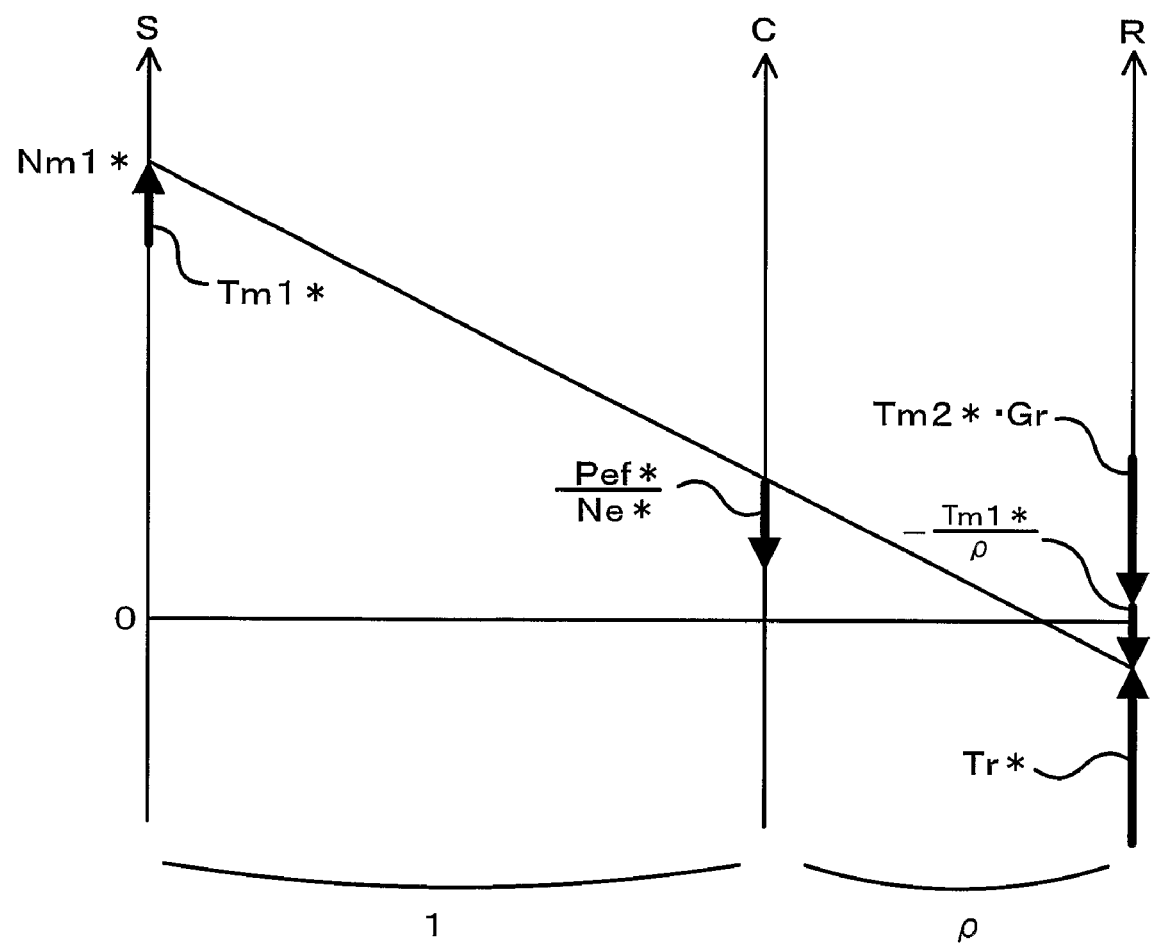
FIG. 13 shows application of engine friction to an assist torque in a reverse drive in the hybrid vehicle of the second embodiment.

The drive control routine of the second embodiment is terminated after sending the target rotation speed Ne* and the target torque Te* of the engine 22 and the torque commands Tm1* and Tm2* of the motors MG1 and MG2 to the engine ECU 24 and to the motor ECU 40 (step S650). FIG. 13 shows application of the engine friction to the assist torque in a reverse drive. As shown in FIG. 13, in response to output of an upward torque Tm1* on the axis S from the motor MG1 under the fuel-cut condition of the engine 22, a downward torque ($-Tm1*/\rho$) acts on the axis R (the ring gear shaft 32a). The downward torque acts in the reverse driving direction of the vehicle and thus functions as the assist torque in a reverse drive. The output of the downward torque on the axis R from the motor MG2 in combination with the output of the upward torque on the axis S from the motor MG1 under the fuel-cut condition of the engine 22 enables a greater torque than the maximum rated torque of the motor MG2 to be applied to the ring gear shaft 32a. This effectively enhances the driving performance in a reverse drive.

As described above, the hybrid vehicle 20B of the second embodiment motors the engine 22 with the motor MG1 under the fuel-cut condition of the engine 22 and applies the engine friction to the assist torque in a reverse drive with the output torque of the motor MG2. This arrangement effectively enhances the driving performance in a reverse drive. The engine 22 and the motor MG1 are controlled with the setting of the engine friction power Pef* restricted to the range of the output limit Wout. This desirably prevents the battery 50 from discharging an excess electric power in the reverse driving state, while ensuring output of the torque demand Tr* to the ring gear shaft 32a for the reverse drive.

In the hybrid vehicle 20B of the second embodiment, the processing equivalent to steps S190 and S200 in the drive control routine of FIG. 2 is executed when the torque demand Tr* is lower than the preset reference torque Tref at step S550, when the vehicle speed V is not lower than the preset reference speed Vref at step S560, or when the output limit Wout is less than the preset reference output Wref at step S570. This processing is, however, not restrictive, and any other suitable processing, for example, the processing equivalent to step S150 in the drive control routine of FIG. 2, may be executed under such conditions.

The hybrid vehicle 20B of the second embodiment applies the engine friction to the assist torque in a reverse drive when the vehicle speed V is lower than the preset reference speed Vref. One possible modification may apply the engine friction to the assist torque in a reverse drive, regardless of the level of the vehicle speed V.

Figure 14:
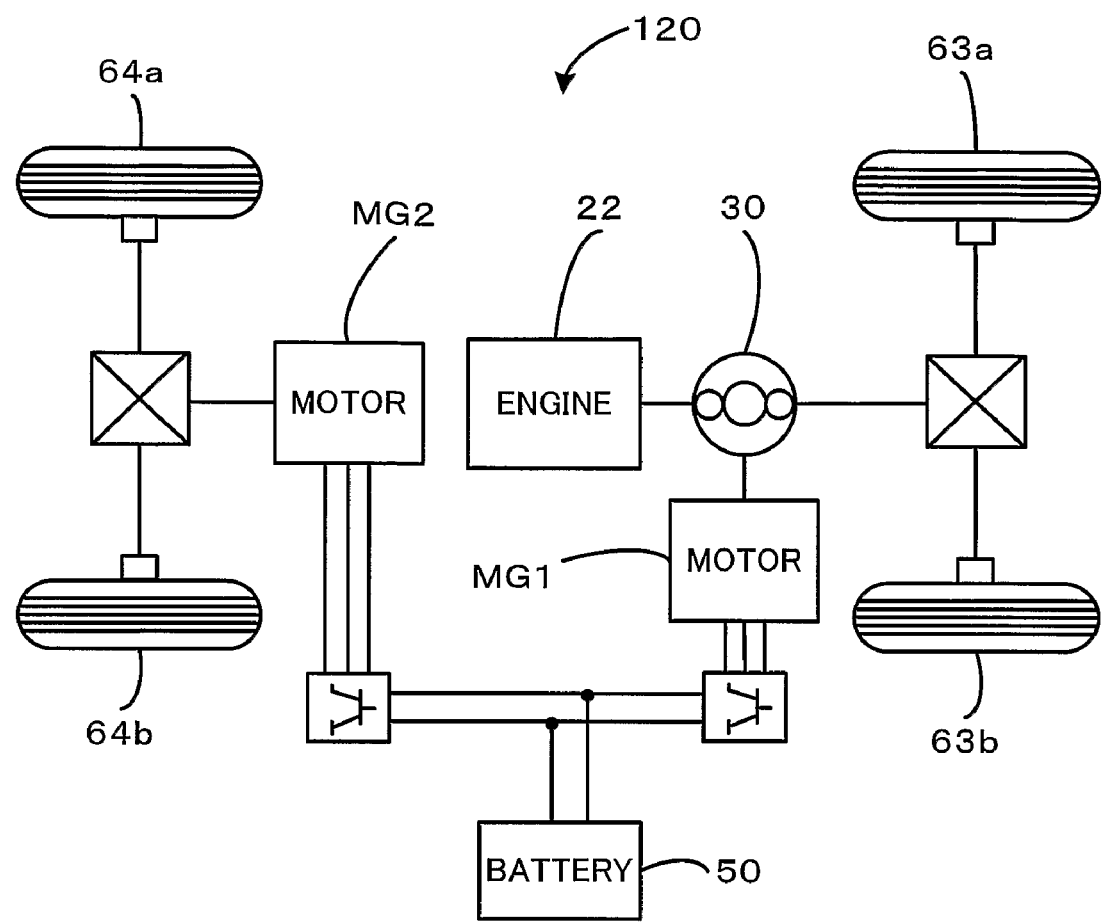
FIG. 14 schematically illustrates the configuration of another hybrid vehicle in one modified example.

In the hybrid vehicle 20 of the first embodiment and the hybrid vehicle 20B of the second embodiment, the power of the motor MG2 goes through the gear change by the reduction gear 35 and is output to the ring gear shaft 32a. The technique of the invention is, however, not restricted to this configuration but is also applicable to a hybrid vehicle 120 of one modified structure shown in FIG. 14. In the hybrid vehicle 120 of this modified configuration, the power of the motor MG2 is connected to a different axle (an axle linked to drive wheels 64a and 64b) from the axle connected with the ring gear shaft 32a (that is, the axle linked to the drive wheels 63a and 63b).

Figure 15:
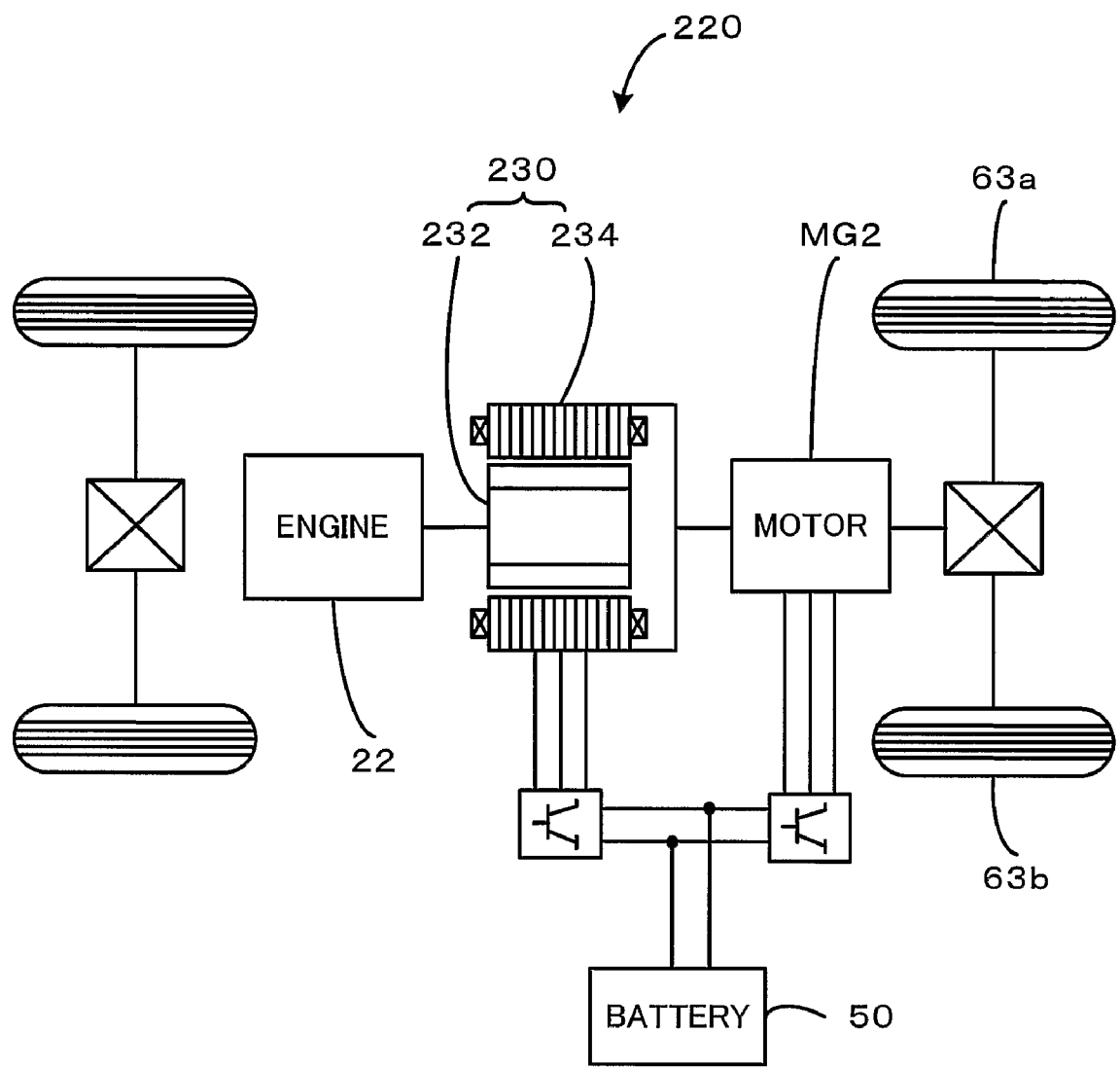
FIG. 15 schematically illustrates the configuration of still another hybrid vehicle in another modified example.

In the hybrid vehicle 20 of the first embodiment and the hybrid vehicle 20B of the second embodiment, the power of the engine 22 is output via the power distribution integration mechanism 30 to the ring gear shaft 32a or the drive shaft linked to the drive wheels 63a and 63b. The technique of the invention is, however, not restricted to this configuration but is also applicable to a hybrid vehicle 220 of another modified structure shown in FIG. 15. The hybrid vehicle 220 of this modified configuration includes a pair-rotor motor 230 that includes an inner rotor 232 connected to the crankshaft 26 of the engine 22 and an outer rotor 234 connected to the drive shaft to output power to the drive wheels 63a and 63b. The pair-rotor motor 230 transmits part of the output power of the engine 22 to the drive shaft, while converting a residual of the output power into electric power.

The embodiments and their modified examples discussed above are to be considered in all aspects as illustrative and not restrictive. There may be many other modifications, changes, and alterations without departing from the scope or spirit of the main characteristics of the present invention.

INDUSTRIAL APPLICABILITY

The technique of the invention is preferably applicable to automobile industries.

The invention claimed is:

1. A power output apparatus that outputs power to a drive shaft, said power output apparatus comprising:
    an internal combustion engine;
    a power conversion transmission structure that is connected to an output shaft of the internal combustion engine and to the drive shaft, said power conversion transmission structure converting at least part of output power of the internal combustion engine into electric power while transmitting a residual of the output power to the drive shaft as power in a preset rotating direction through input and output of electric power and mechanical power;
    a motor that is capable of outputting power both in a normal rotating direction and in a reverse rotating direction to the drive shaft with the electric power converted by the power conversion transmission structure;
    a driving force demand setting module that sets a required driving force of the drive shaft in response to an operator's instruction; and
    a control module that, when the drive shaft is to be rotated in another direction different from the preset rotating direction simultaneously with output of power from the internal combustion engine, sets a target drive point to an offset drive point, which has an offset of a rotation speed toward a higher rotation speed from a preset drive point that ensures power output from the internal combustion engine under a predetermined condition, while keeping an output power level of the internal combustion engine unchanged, and drives and controls the internal combustion engine, the power conversion transmission structure, and the motor to drive the internal combustion engine at the set target drive point and to rotate the drive shaft in the another direction with the required driving force.

2. A power output apparatus in accordance with claim 1, wherein the predetermined condition is a high fuel consumption condition.

3. A power output apparatus in accordance with claim 1, wherein said control module sets the target drive point to have a higher rotation speed corresponding to a higher level of the required driving force.

4. A power output apparatus in accordance with claim 1, said power output apparatus further comprising:
    a rotation speed measurement unit that measures a rotation speed of the drive shaft,
    wherein said control module executes the control when the measured rotation speed of the drive shaft is lower than a preset reference speed.

5. A power output apparatus in accordance with claim 1, wherein the power conversion transmission structure comprises:
- a three shaft-type power input output mechanism that is linked to three shafts, that is, the output shaft of the internal combustion engine, the drive shaft, and a third rotating shaft, and automatically determines power input from and output to a residual one shaft based on powers input from and output to any two shafts among the three shafts; and
- a generator that inputs and outputs power from and to the third rotating shaft.

6. A power output apparatus in accordance with claim 1, wherein the power conversion transmission structure comprises:
- a pair-rotor motor that has a first rotor connected to the output shaft of the internal combustion engine and a second rotor connected to the drive shaft and outputs at least part of the output power of the internal combustion engine to the drive shaft through input and output of electric power and mechanical power by electromagnetic functions of the first rotor and the second rotor.

7. A motor vehicle, comprising:
- an internal combustion engine;
- a power conversion transmission structure that is connected to an output shaft of the internal combustion engine and to a drive shaft linked with an axle of said motor vehicle, said power conversion transmission structure converting at least part of output power of the internal combustion engine into electric power while transmitting a residual of the output power to the drive shaft as power in a forward run direction through input and output of electric power and mechanical power;
- a motor that is capable of outputting power both in a normal rotating direction and in a reverse rotating direction to the drive shaft with the electric power converted by the power conversion transmission structure;
- a driving force demand setting module that sets a required driving force of the drive shaft in response to a driver's instruction; and
- a control module that, when the drive shaft is to be rotated in in a reverse run direction simultaneously with output of power from the internal combustion engine, sets a target drive point to an offset drive point, which has an offset of a rotation speed toward a higher rotation speed from a preset drive point that ensures power output from the internal combustion engine under a predetermined condition, while keeping an output power level of the internal combustion engine unchanged, and drives and controls the internal combustion engine, the power conversion transmission structure, and the motor to drive the internal combustion engine at the set target drive point and to rotate the drive shaft in the reverse run direction with the required driving force.

8. A motor vehicle in accordance with claim 7, wherein said driving force demand setting module sets the required driving force corresponding to an accelerator opening, and said control module sets the target drive point corresponding to the accelerator opening, instead of the required driving force.

9. A power output apparatus that outputs power to a drive shaft, said power output apparatus comprising:
- an internal combustion engine;
- an electric power-mechanical power input output structure that is connected to an output shaft of the internal combustion engine and to the drive shaft, and transmits at least part of output power of the internal combustion engine to the drive shaft as power in a preset rotating direction through input and output of electric power and mechanical power;
- a motor that is capable of outputting power both in a normal rotating direction and in a reverse rotating direction to the drive shaft; and
- a control module that executes engine resistance application control when the drive shaft is to be rotated in another direction different from the preset rotating direction during operation of the internal combustion engine, the engine resistance application control driving and controlling the internal combustion engine, the electric power-mechanical power input output structure, and the motor and causing the electric power-mechanical power input output structure to output a braking force due to a rotational resistance of the internal combustion engine to the drive shaft as a driving force in the another direction different from the preset rotating direction through a motoring of the internal combustion engine with a fuel injection stop state while causing the motor to output a driving force in the another direction different from the preset rotating direction to the drive shaft.

10. A power output apparatus in accordance with claim 9, said power output apparatus further comprising:
- a driving force demand setting module that sets a required driving force of the drive shaft in response to an operator's instruction,
- wherein said control module drives and controls the internal combustion engine, the electric power-mechanical power input output structure, and the motor to ensure output of a driving force corresponding to the required driving force to the drive shaft.

11. A power output apparatus in accordance with claim 10, wherein said control module executes the engine resistance application control when the required driving force is not less than a preset reference driving force.

12. A power output apparatus in accordance with claim 9, said power output apparatus further comprising:
- a rotation speed measurement unit that measures a rotation speed of the drive shaft,
- wherein said control module executes the engine resistance application control when the measured rotation speed of the drive shaft is lower than a preset reference speed.

13. A power output apparatus in accordance with claim 9, said power output apparatus further comprising:
- an accumulator unit that transmits electric power to and from the electric power-mechanical power input output structure and the motor; and
- an output limit setting module that sets an output limit of the accumulator unit,
- wherein said control module executes the engine resistance application control within a range of the output limit of the accumulator unit.

14. A power output apparatus in accordance with claim 9, wherein the electric power-mechanical power input output structure comprises:
- a three shaft-type power input output mechanism that is linked to three shafts, that is, the output shaft of the internal combustion engine, the drive shaft, and a third rotating shaft, and automatically determines power input from and output to a residual one shaft based on powers input from and output to any two shafts among the three shafts; and
- a generator that inputs and outputs power from and to the third rotating shaft.

15. A power output apparatus in accordance with claim 9, wherein the electric power-mechanical power input output structure comprises:

a pair-rotor motor that has a first rotor connected to the output shaft of the internal combustion engine and a second rotor connected to the drive shaft and outputs at least part of the output power of the internal combustion engine to the drive shaft through input and output of electric power and mechanical power by electromagnetic functions of the first rotor and the second rotor.

16. A motor vehicle, comprising:

an internal combustion engine;

an electric power-mechanical power input output structure that is connected to an output shaft of the internal combustion engine and to a drive shaft linked with an axle of said motor vehicle, and transmits at least part of output power of the internal combustion engine to the drive shaft as power in a forward run direction through input and output of electric power and mechanical power;

a motor that is capable of outputting power both in a normal rotating direction and in a reverse rotating direction to the drive shaft; and a control module that executes engine resistance application control when the drive shaft is to be rotated in a reverse run direction during operation of the internal combustion engine, the engine resistance application control driving and controlling the internal combustion engine, the electric power-mechanical power input output structure, and the motor and causing the electric power-mechanical power input output structure to output a braking force due to a rotational resistance of the internal combustion engine to the drive shaft as a driving force in the reverse run direction through a motoring of the internal combustion engine with a fuel injection stop state while causing the motor to output a driving force in the reverse run direction to the drive shaft.

17. A control method of a power output apparatus, said power output apparatus comprising: an internal combustion engine; a power conversion transmission structure that is connected to an output shaft of the internal combustion engine and to a drive shaft, said power conversion transmission structure converting at least part of output power of the internal combustion engine into electric power while transmitting a residual of the output power to the drive shaft as power in a preset rotating direction through input and output of electric power and mechanical power; and a motor that is capable of outputting power both in a normal rotating direction and in a reverse rotating direction to the drive shaft with the electric power converted by the power conversion transmission structure, said control method comprising the steps of:
(a) setting a required driving force of the drive shaft in response to an operator's instruction;
(b) when the drive shaft is to be rotated in another direction different from the preset rotating direction simultaneously with output of power from the internal combustion engine, setting a target drive point to an offset drive point, which has an offset of a rotation speed toward a higher rotation speed from a preset drive point that ensures power output from the internal combustion engine under a predetermined condition, while keeping an output power level of the internal combustion engine unchanged; and
(c) driving and controlling the internal combustion engine, the power conversion transmission structure, and the motor to drive the internal combustion engine at the set target drive point and to rotate the drive shaft in the another direction with the required driving force.

18. A control method of a power output apparatus, said power output apparatus comprising: an internal combustion engine; an electric power-mechanical power input output structure that is connected to an output shaft of the internal combustion engine and to a drive shaft, and transmits at least part of output power of the internal combustion engine to the drive shaft as power in a preset rotating direction through input and output of electric power and mechanical power; and a motor that is capable of outputting power both in a normal rotating direction and in a reverse rotating direction to the drive shaft, said control method comprising the step of:
when the drive shaft is to be rotated in another direction different from the preset rotating direction during operation of the internal combustion engine, driving and controlling the internal combustion engine, the electric power-mechanical power input output structure, and the motor and causing the electric power-mechanical power input output structure to output a braking force due to a rotational resistance of the internal combustion engine to the drive shaft as a driving force in the another direction different from the preset rotating direction through a motoring of the internal combustion engine with a fuel injection stop state while causing the motor to output a driving force in the another direction different from the preset rotating direction to the driveshaft.

* * * * *